US009769029B2

(12) United States Patent
Makrucki

(10) Patent No.: US 9,769,029 B2
(45) **Date of Patent: *Sep. 19, 2017**

(54) APPLICATION AND INFRASTRUCTURE PERFORMANCE ANALYSIS AND FORECASTING SYSTEM AND METHOD

(71) Applicant: JPMorgan Chase Bank, N.A., New York, NY (US)

(72) Inventor: Brad Makrucki, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,032

(22) Filed: Mar. 23, 2017

(65) Prior Publication Data

US 2017/0195189 A1 Jul. 6, 2017

Related U.S. Application Data

(63) Continuation of application No. 14/513,873, filed on Oct. 14, 2014, now Pat. No. 9,641,399.

(51) Int. Cl.
*H04L 12/24* (2006.01)
*H04L 12/733* (2013.01)
*H04L 12/26* (2006.01)

(52) U.S. Cl.
CPC .......... *H04L 41/147* (2013.01); *H04L 41/145* (2013.01); *H04L 43/062* (2013.01); *H04L 45/122* (2013.01)

(58) Field of Classification Search
CPC . H04L 41/147; H04L 43/062; H04L 43/0864; H04L 41/145
See application file for complete search history.

(56) References Cited

U.S. PATENT DOCUMENTS

2005/0154576 A1* 7/2005 Tarui .................. H04L 41/0853 703/22
2007/0067296 A1* 3/2007 Malloy ................. H04L 41/145
2007/0250630 A1* 10/2007 Blanding .................. G06F 9/00 709/226
2008/0177518 A1* 7/2008 Krishnamoorthy . G06F 17/5009 703/9

(Continued)

*Primary Examiner* — Arvin Eskandania
*Assistant Examiner* — Javier O Guzman
(74) *Attorney, Agent, or Firm* — Goodwin Procter LLP

(57) ABSTRACT

Embodiments of the present invention are directed to a computer implemented web based application and infrastructure performance analysis and forecasting system and method for improving the performance of at least one application and infrastructure and reducing complexity of analyzing the performance of the application and infrastructure. The system and method receive infrastructure input from a user regarding application and infrastructure configuration, as well as performance objective(s). Based on the infrastructure input received from the user, a modeling engine determines at least one application and infrastructure performance model. The system and method then receive model specific input from the user for each model. Based on the information received from the user, a model computation engine computes output for the models which is then displayed to the user.

28 Claims, 19 Drawing Sheets

(56) References Cited

U.S. PATENT DOCUMENTS

2010/0077372 A1* 3/2010 Xiang ................. G06F 17/5009
716/106
2014/0215464 A1* 7/2014 Birke .................. G06F 9/45533
718/1
2015/0039942 A1* 2/2015 Che ..................... G06F 11/3612
714/38.1

* cited by examiner

Figure 4A:
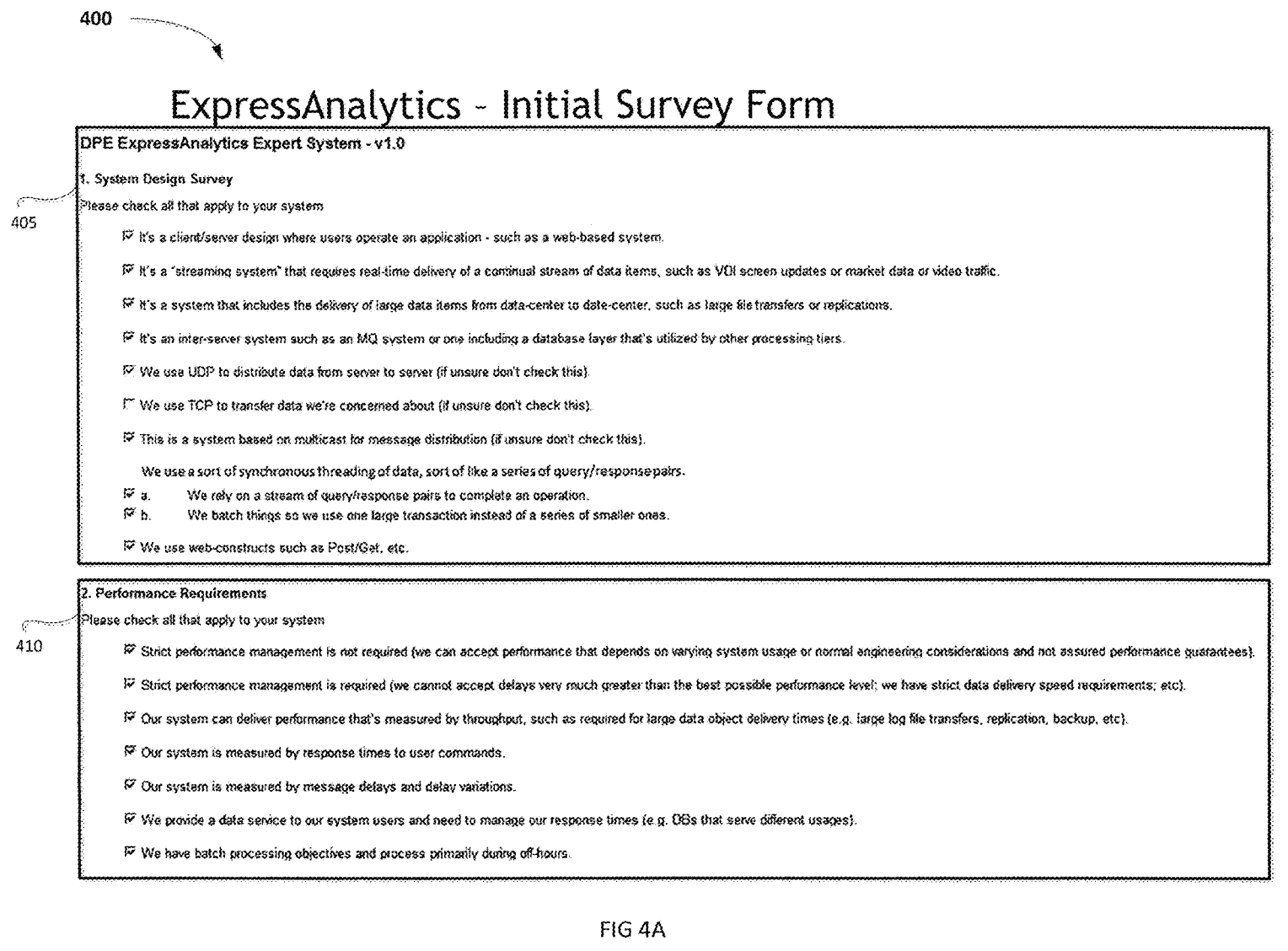

400

ExpressAnalytics - Initial Survey Form

DPE ExpressAnalytics Expert System - v1.0

405

1. System Design Survey

Please check all that apply to your system

- [x] It's a client/server design where users operate an application - such as a web-based system.
- [x] It's a "streaming system" that requires real-time delivery of a continual stream of data items, such as VDI screen updates or market data or video traffic.
- [x] It's a system that includes the delivery of large data items from data-center to date-center, such as large file transfers or replications.
- [x] It's an inter-server system such as an MQ system or one including a database layer that's utilized by other processing tiers.
- [x] We use UDP to distribute data from server to server (if unsure don't check this).
- [ ] We use TCP to transfer data we're concerned about (if unsure don't check this).
- [x] This is a system based on multicast for message distribution (if unsure don't check this).

We use a sort of synchronous threading of data, sort of like a series of query/response pairs.

- [x] a. We rely on a stream of query/response pairs to complete an operation.
- [x] b. We batch things so we use one large transaction instead of a series of smaller ones.

- [x] We use web-constructs such as Post/Get, etc.

410

2. Performance Requirements

Please check all that apply to your system

- [x] Strict performance management is not required (we can accept performance that depends on varying system usage or normal engineering considerations and not assured performance guarantees).
- [x] Strict performance management is required (we cannot accept delays very much greater than the best possible performance level; we have strict data delivery speed requirements; etc).
- [x] Our system can deliver performance that's measured by throughput, such as required for large data object delivery times (e.g. large log file transfers, replication, backup, etc).
- [x] Our system is measured by response times to user commands.
- [x] Our system is measured by message delays and delay variations.
- [x] We provide a data service to our system users and need to manage our response times (e.g. DBs that serve different usages).
- [x] We have batch processing objectives and process primarily during off-hours.

Figure 4B:
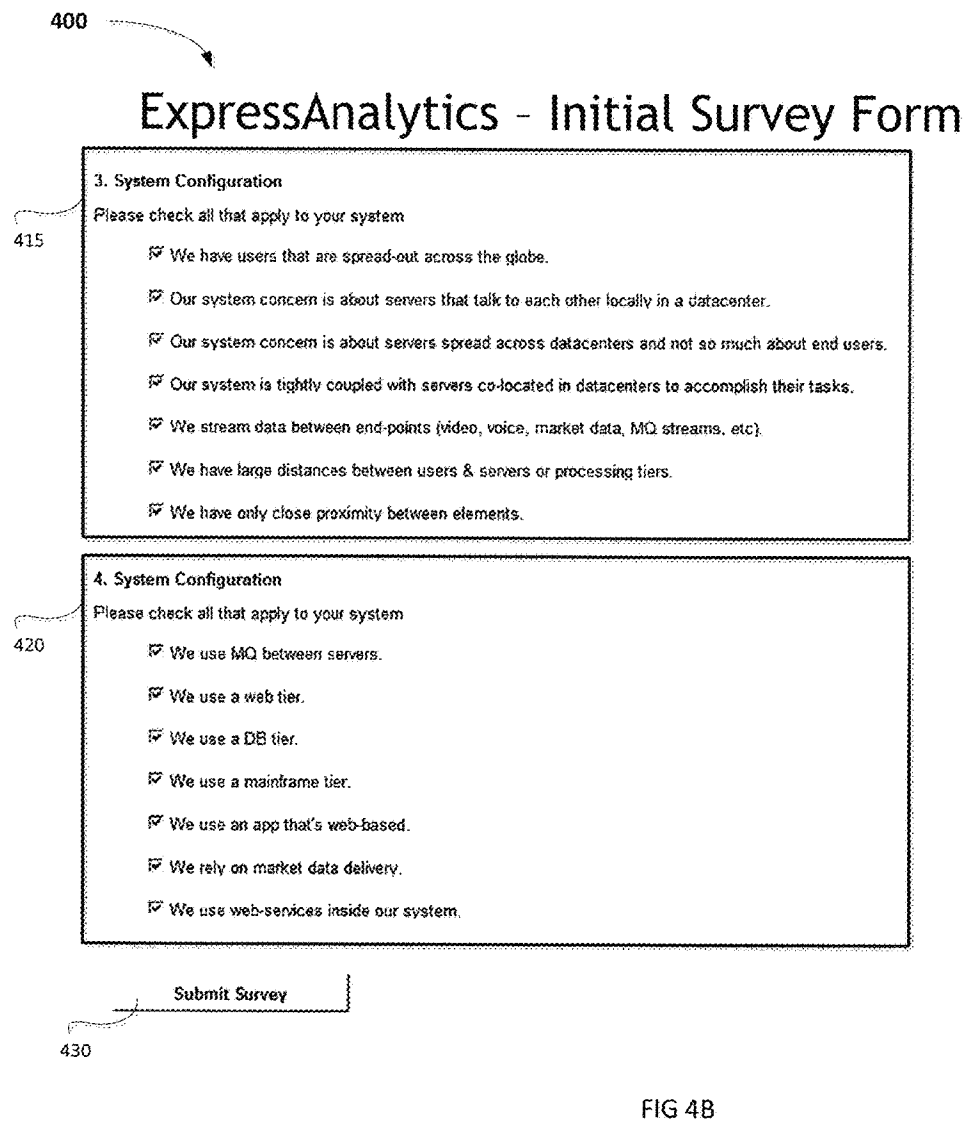

ExpressAnalytics – Initial Survey Form

415

3. System Configuration

Please check all that apply to your system

- ☑ We have users that are spread-out across the globe.
- ☑ Our system concern is about servers that talk to each other locally in a datacenter.
- ☑ Our system concern is about servers spread across datacenters and not so much about end users.
- ☑ Our system is tightly coupled with servers co-located in datacenters to accomplish their tasks.
- ☑ We stream data between end-points (video, voice, market data, MQ streams, etc).
- ☑ We have large distances between users & servers or processing tiers.
- ☑ We have only close proximity between elements.

420

4. System Configuration

Please check all that apply to your system

- ☑ We use MQ between servers.
- ☑ We use a web tier.
- ☑ We use a DB tier.
- ☑ We use a mainframe tier.
- ☑ We use an app that's web-based.
- ☑ We rely on market data delivery.
- ☑ We use web-services inside our system.

Submit Survey

ExpressAnalytics - Model 1 Input

510

User Response Time Analysis Tool

1. User-Server Configuration (check one) - see the diagram for a depiction of a typical system
   - ☐ Both are in major JPMC datacenters such as RDC, CDCx, MCC, etc. VDI is like this.
   - ☑ Both are in non-datacenter sites, such as corporate sites, branches, offices, etc. This is not common.
   - ☐ One is in a datacenter, the other is not. Users with PCs in corp sites are like this.

2. What's the round-trip-time between users and servers?
   This can be measured as the minimum ping round-trip-time between servers at the two locations
   [ 50 ] msec round-trip (reported by ping for example)

3. About how many objects are sent to the server as part of a transaction? [ 5 ]
   Are they sent sequentially or in parallel?
   - ☑ Sequential
   - ☐ Parallel How large are the objects (Kbytes): [ 50 ]

4. About how many objects comprise a response? [ 9 ]
   Are they sent sequentially or in parallel?
   - ☑ Sequential
   - ☐ Parallel How large are the objects (Kbytes): [ 100 ]

5. Are the objects part of GET/POST web commands?
   If yes, then consult this web-page for further information on how to optimize web-page performance:
   http://msdn.microsoft.com/en-us/magazine/dd188562.aspx Submit for Analysis

530

520

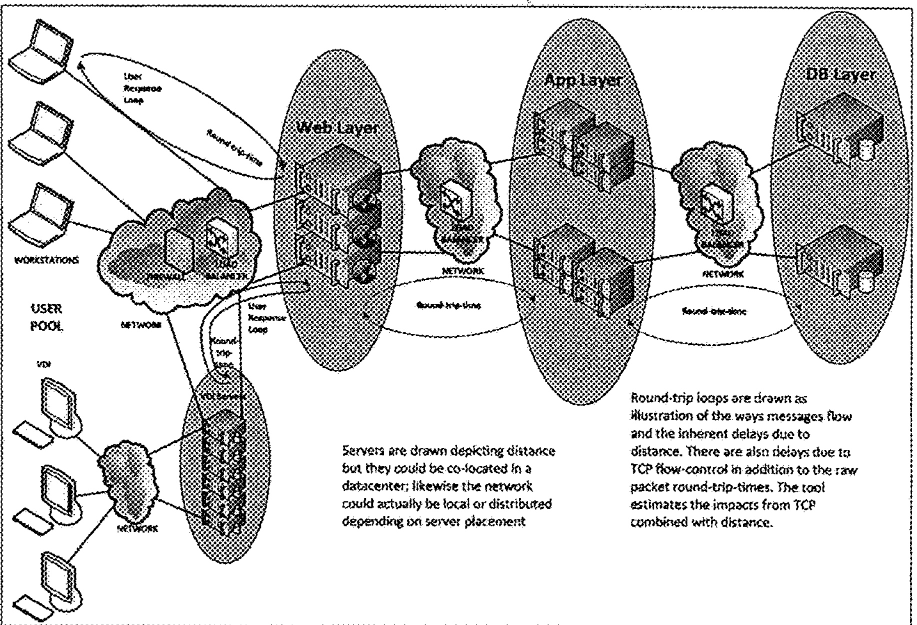

Figure 5B:
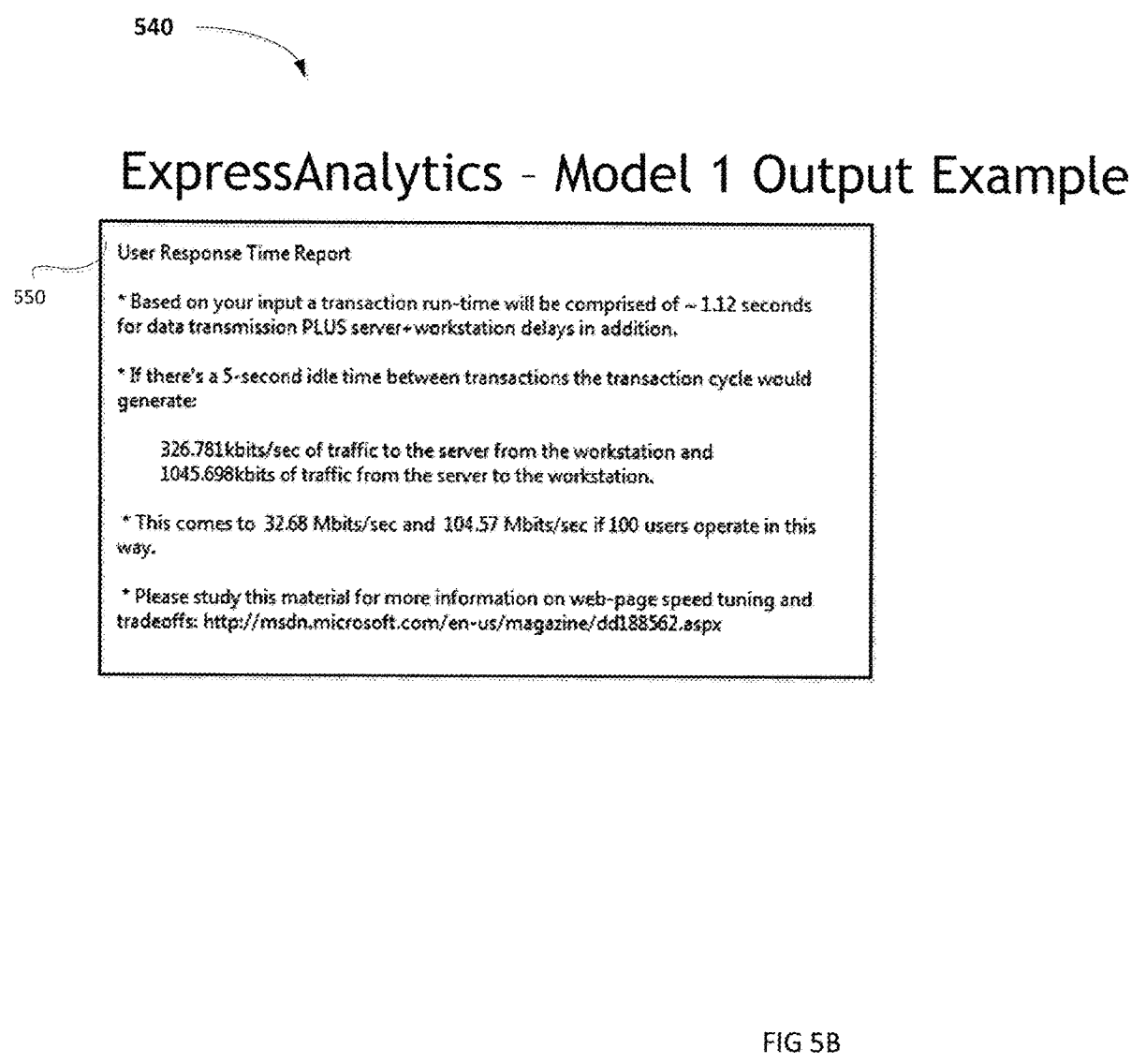

ExpressAnalytics – Model 1 Output Example

550

User Response Time Report

* Based on your input a transaction run-time will be comprised of ~ 1.12 seconds for data transmission PLUS server+workstation delays in addition.

* If there's a 5-second idle time between transactions the transaction cycle would generate:

326.781kbits/sec of traffic to the server from the workstation and 1045.698kbits of traffic from the server to the workstation.

* This comes to 32.68 Mbits/sec and 104.57 Mbits/sec if 100 users operate in this way.

* Please study this material for more information on web-page speed tuning and tradeoffs: http://msdn.microsoft.com/en-us/magazine/dd188562.aspx

ExpressAnalytics - Model 2 Input

610

Bulk Transfer Analysis Tool

1. Where are your transfer end-points? (check one)
   - ☐ Both are in major JPMC datacenters such as RDC, CDCx, MCC, etc.
   - ☑ Both are in non-datacenter sites, such as corporate sites, branches, offices, etc
   - ☐ One is in a datacenter, the other is not 2. How large are the transfers (in bytes to be transmitted)? (check one)
   - ☐ Less than 50Mbytes
   - ☐ Between 50Mbytes and 250Mbytes
   - ☑ Between 250Mbytes and 1Gbytes
   - ☐ Between 1Gbytes and 10Gbytes
   - ☐ More than 10Gbytes 3. What's the round-trip-time between your end-points?
   This can be measured as the minimum ping round-trip-time between servers at the two locations
   [ 50 ] msec round-trip (reported by ping for example)

4. Do you have transfer-time requirements?
   - ☐ Yes
   If yes, then specify a transfer size and time transfer-time objective for analysis:
   [ 100 ] Mbytes
   [ 100 ] Minutes 5. What application/tool is used for the transfer?
   - ☑ FTP, SCP or sFTP
   - ☑ NetApp replication products or similar where throttles can be set and/or the product can saturate network links
   - ☑ Windows copy operations

620

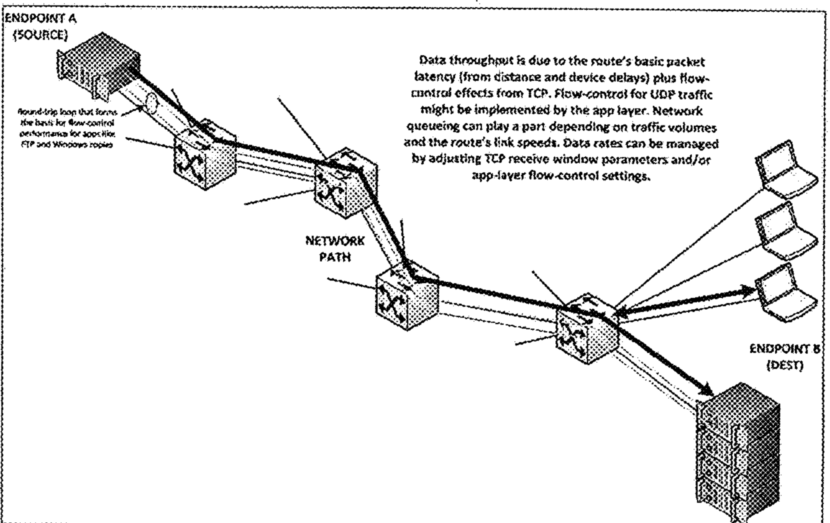

Figure 6B:
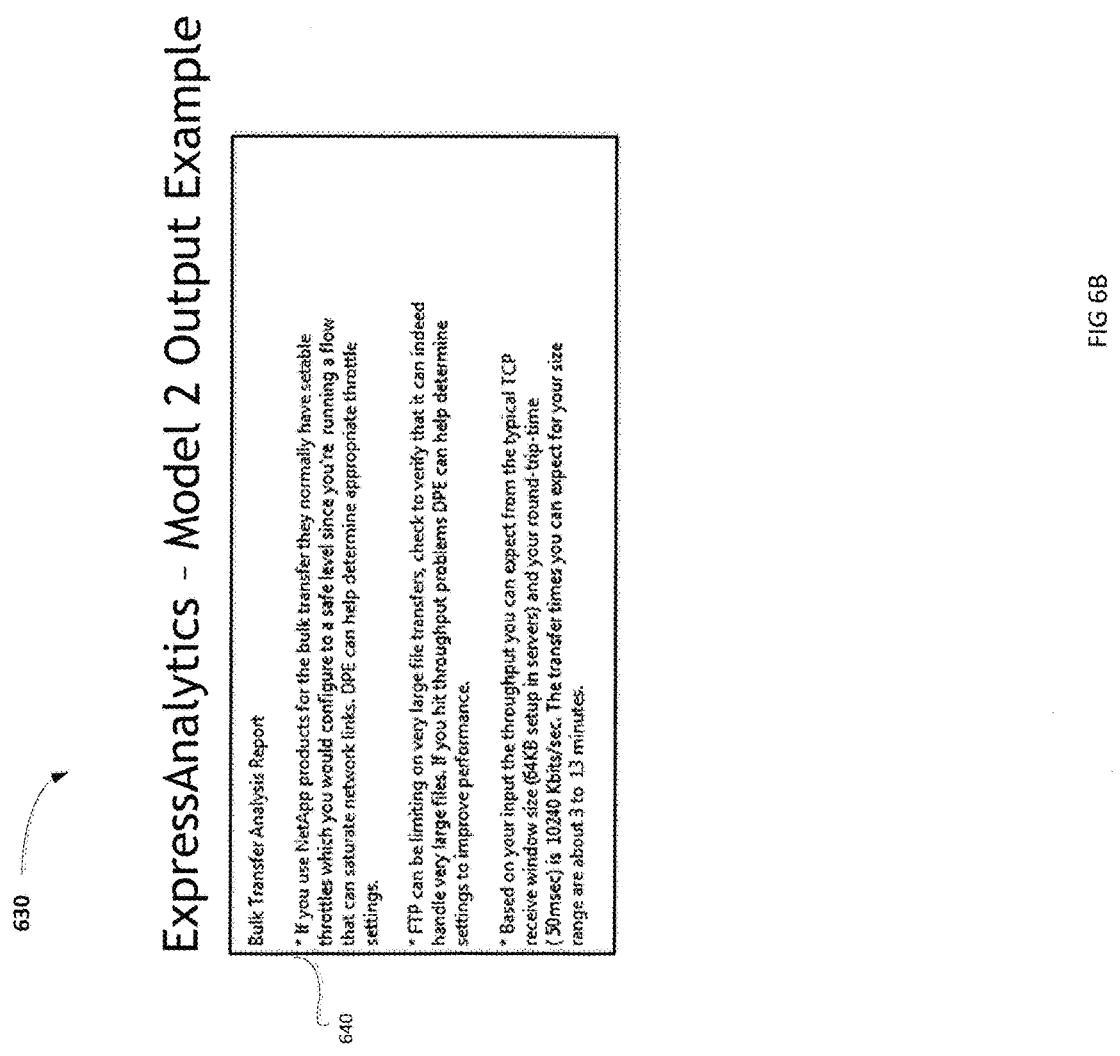

ExpressAnalytics - Model 2 Output Example

640

Bulk Transfer Analysis Report

* If you use NetApp products for the bulk transfer they normally have setable throttles which you would configure to a safe level since you're running a flow that can saturate network links. DPE can help determine appropriate throttle settings.

* FTP can be limiting on very large file transfers, check to verify that it can indeed handle very large files. If you hit throughput problems DPE can help determine settings to improve performance.

* Based on your input the throughput you can expect from the typical TCP receive window size (64KB setup in servers) and your round-trip-time (50msec) is 10240 Kbits/sec. The transfer times you can expect for your size range are about 3 to 13 minutes.

Figure 7A:
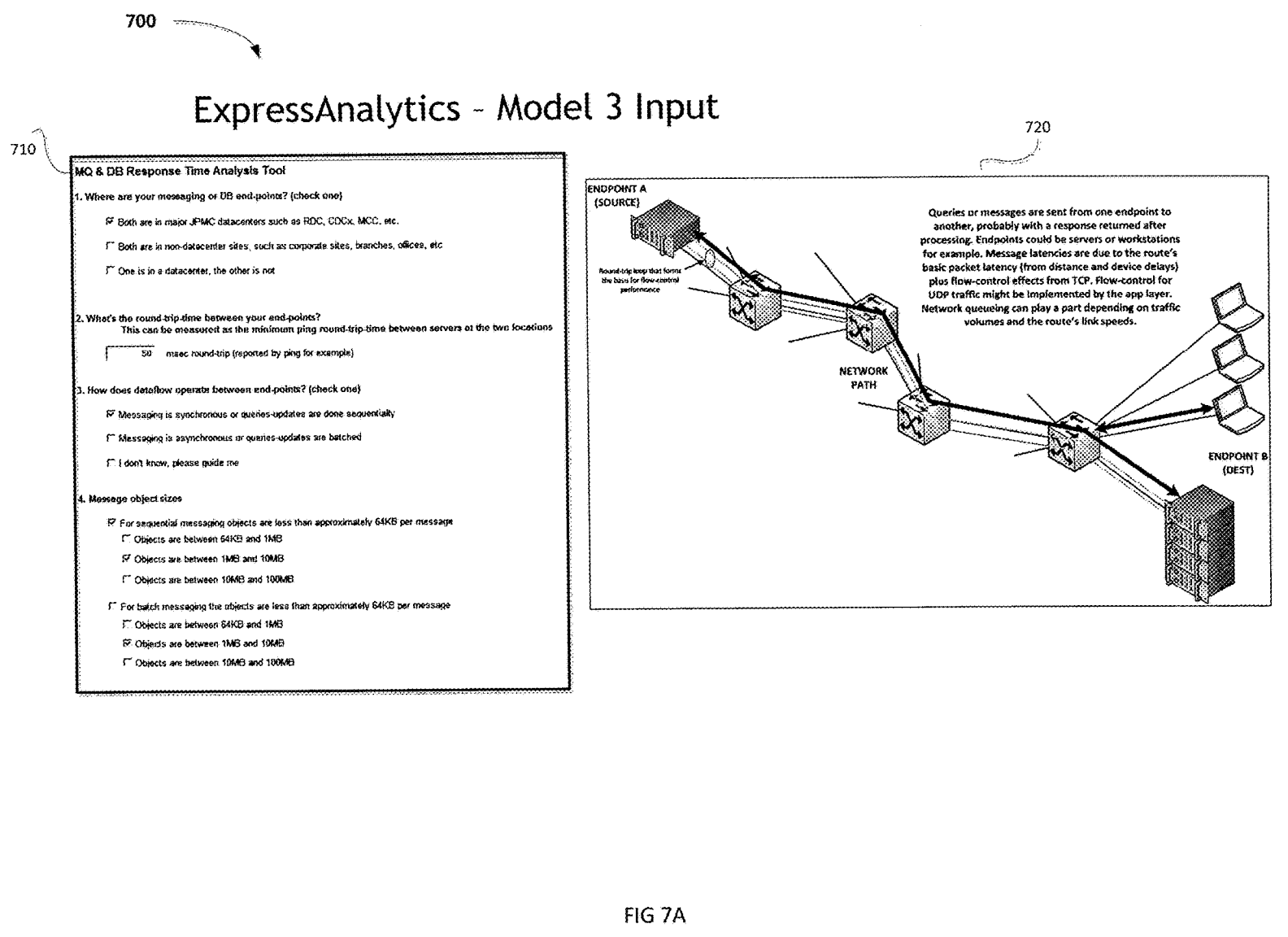

ExpressAnalytics – Model 3 Input

710

MQ & DB Response Time Analysis Tool

1. Where are your messaging or DB end-points? (check one)
   - ☑ Both are in major JPMC datacenters such as RDC, CDCx, MCC, etc.
   - ☐ Both are in non-datacenter sites, such as corporate sites, branches, offices, etc
   - ☐ One is in a datacenter, the other is not 2. What's the round-trip-time between your end-points?
   This can be measured as the minimum ping round-trip-time between servers at the two locations
   - [ 50 ] msec round-trip (reported by ping for example)

3. How does dataflow operate between end-points? (check one)
   - ☑ Messaging is synchronous or queries-updates are done sequentially
   - ☐ Messaging is asynchronous or queries-updates are batched
   - ☐ I don't know, please guide me 4. Message object sizes
   - ☑ For sequential messaging objects are less than approximately 64KB per message
     - ☐ Objects are between 64KB and 1MB
     - ☑ Objects are between 1MB and 10MB
     - ☐ Objects are between 10MB and 100MB
   - ☐ For batch messaging the objects are less than approximately 64KB per message
     - ☐ Objects are between 64KB and 1MB
     - ☑ Objects are between 1MB and 10MB
     - ☐ Objects are between 10MB and 100MB

Figure 7B:
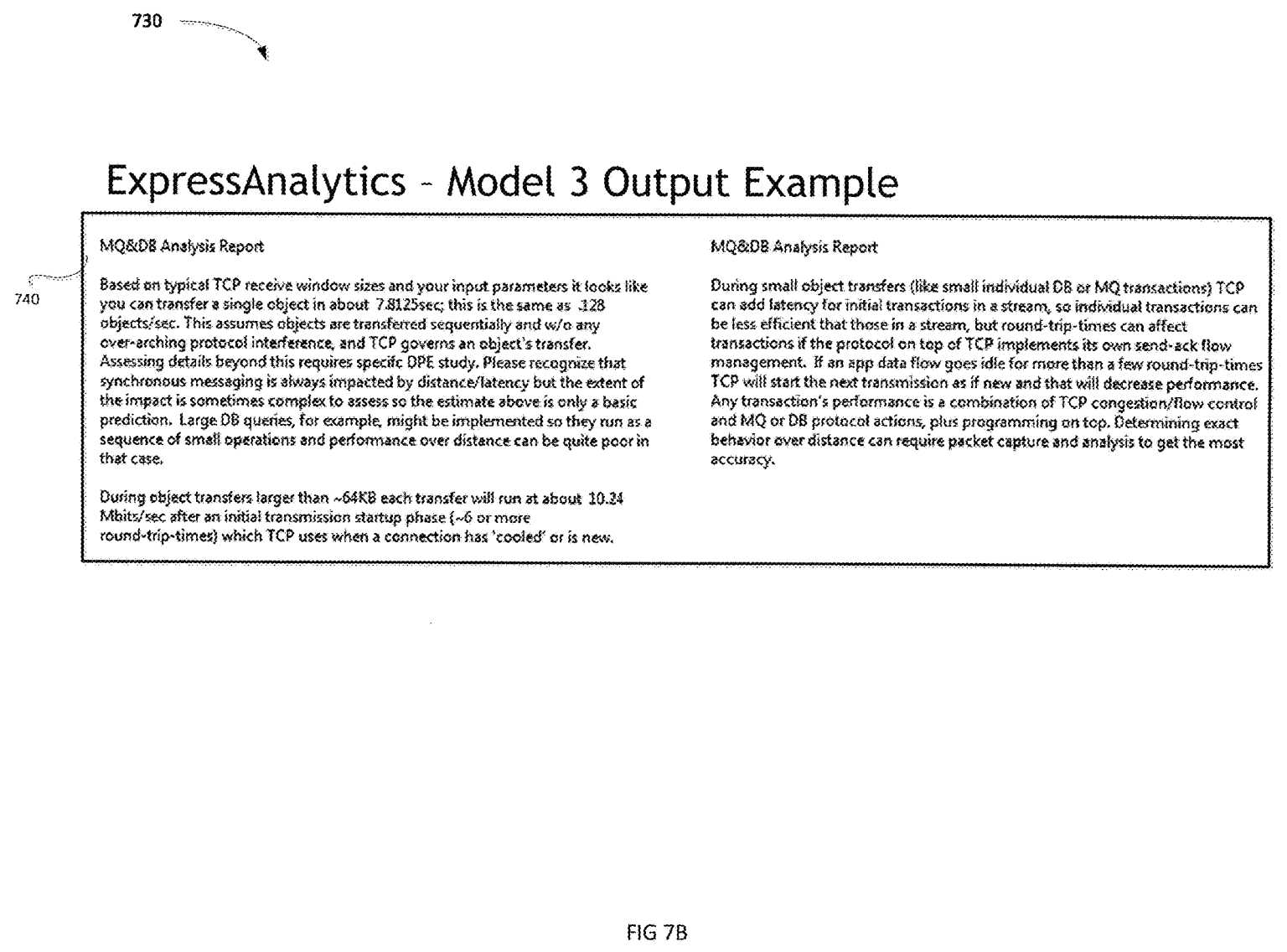

ExpressAnalytics - Model 3 Output Example

740

MQ&DB Analysis Report

Based on typical TCP receive window sizes and your input parameters it looks like you can transfer a single object in about 7.8125sec; this is the same as .128 objects/sec. This assumes objects are transferred sequentially and w/o any over-arching protocol interference, and TCP governs an object's transfer. Assessing details beyond this requires specific DPE study. Please recognize that synchronous messaging is always impacted by distance/latency but the extent of the impact is sometimes complex to assess so the estimate above is only a basic prediction. Large DB queries, for example, might be implemented so they run as a sequence of small operations and performance over distance can be quite poor in that case.

During object transfers larger than ~64KB each transfer will run at about 10.34 Mbits/sec after an initial transmission startup phase (~6 or more round-trip-times) which TCP uses when a connection has 'cooled' or is new.

MQ&DB Analysis Report

During small object transfers (like small individual DB or MQ transactions) TCP can add latency for initial transactions in a stream, so individual transactions can be less efficient that those in a stream, but round-trip-times can affect transactions if the protocol on top of TCP implements its own send-ack flow management. If an app data flow goes idle for more than a few round-trip-times TCP will start the next transmission as if new and that will decrease performance. Any transaction's performance is a combination of TCP congestion/flow control and MQ or DB protocol actions, plus programming on top. Determining exact behavior over distance can require packet capture and analysis to get the most accuracy.

ExpressAnalytics - Model 4 Input

810

Message Delay and Variation Analysis Tool

1. What's the round-trip-time between your end-points?

[ 50 ] msec round-trip (reported by ping for example)

2. Message object sizes (check one)

- ☐ Objects are up to 64KB in size
- ☑ Objects are between 64KB and 1MB
- ☐ Objects are between 1MB and 10MB
- ☐ Objects are between 10MB and 100MB 3. TCP Inter-message timing

[ 500 ] msec between message sends on the same TCP connection (blank if not used)

4. UDP Messaging Rate

[ 500 ] msec between message sends (blank if not used)

Submit for Analysis

830

820

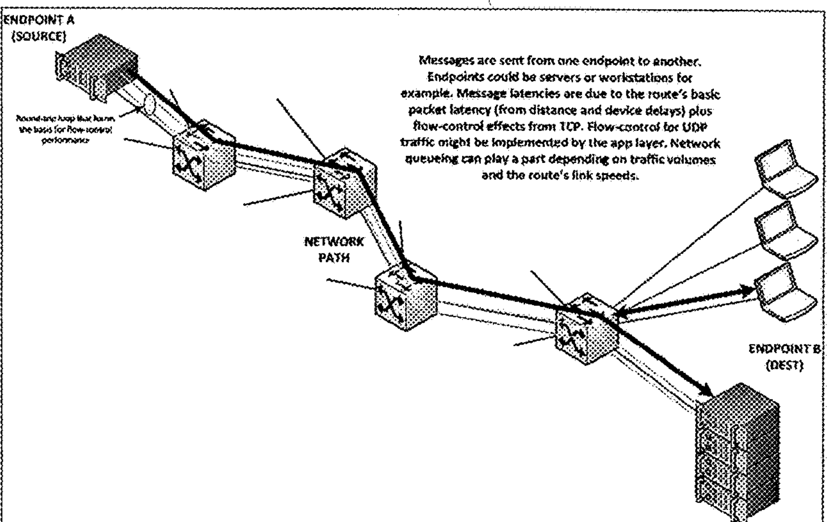

Figure 8B:
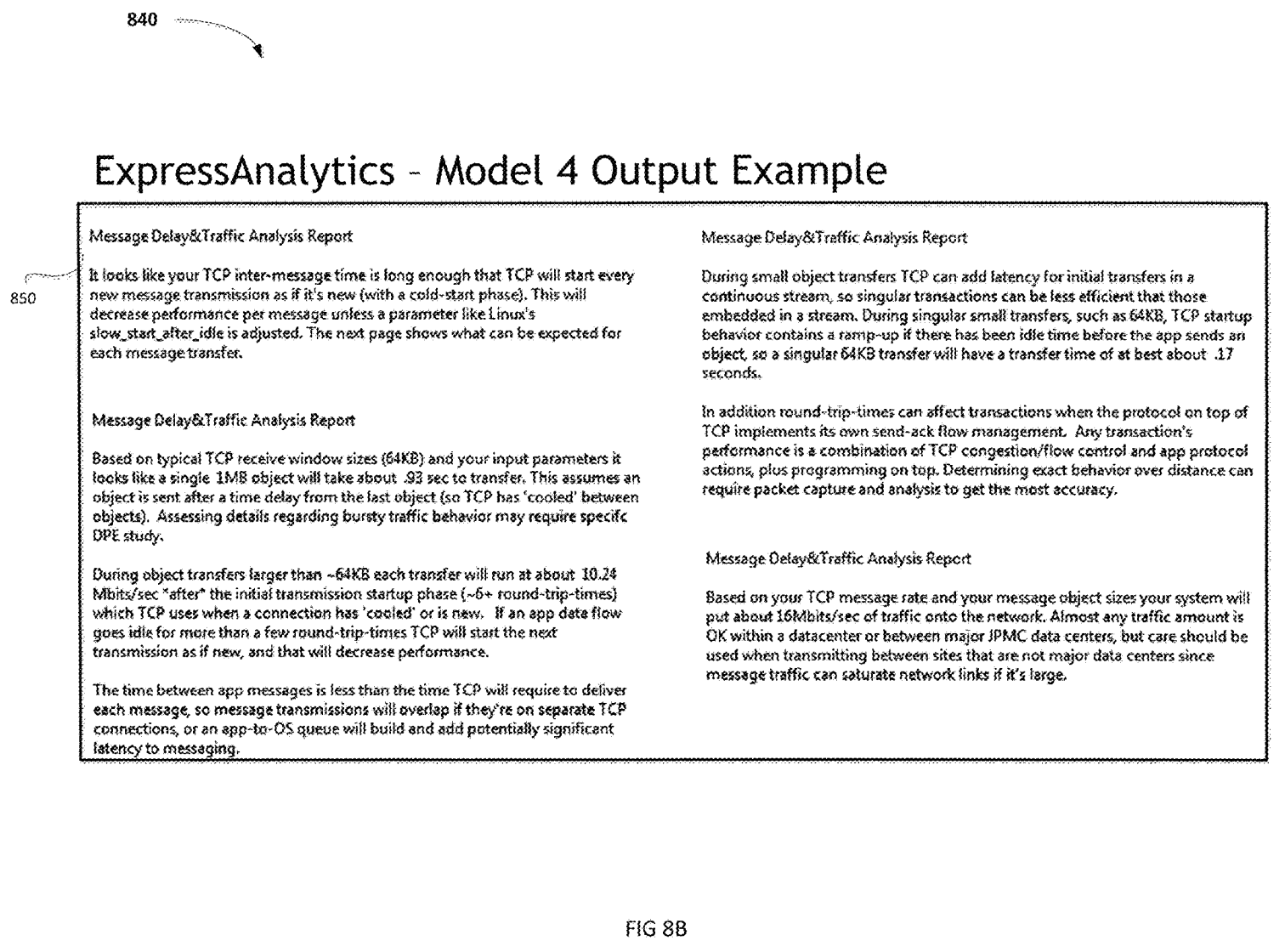

ExpressAnalytics - Model 4 Output Example

850

Message Delay&Traffic Analysis Report

It looks like your TCP inter-message time is long enough that TCP will start every new message transmission as if it's new (with a cold-start phase). This will decrease performance per message unless a parameter like Linux's slow_start_after_idle is adjusted. The next page shows what can be expected for each message transfer.

Message Delay&Traffic Analysis Report

Based on typical TCP receive window sizes (64KB) and your input parameters it looks like a single 1MB object will take about .93 sec to transfer. This assumes an object is sent after a time delay from the last object (so TCP has 'cooled' between objects). Assessing details regarding bursty traffic behavior may require specifc DPE study.

During object transfers larger than ~64KB each transfer will run at about 10.24 Mbits/sec *after* the initial transmission startup phase (~6+ round-trip-times) which TCP uses when a connection has 'cooled' or is new. If an app data flow goes idle for more than a few round-trip-times TCP will start the next transmission as if new, and that will decrease performance.

The time between app messages is less than the time TCP will require to deliver each message, so message transmissions will overlap if they're on separate TCP connections, or an app-to-OS queue will build and add potentially significant latency to messaging.

Message Delay&Traffic Analysis Report

During small object transfers TCP can add latency for initial transfers in a continuous stream, so singular transactions can be less efficient that those embedded in a stream. During singular small transfers, such as 64KB, TCP startup behavior contains a ramp-up if there has been idle time before the app sends an object, so a singular 64KB transfer will have a transfer time of at best about .17 seconds.

In addition round-trip-times can affect transactions when the protocol on top of TCP implements its own send-ack flow management. Any transaction's performance is a combination of TCP congestion/flow control and app protocol actions, plus programming on top. Determining exact behavior over distance can require packet capture and analysis to get the most accuracy.

Message Delay&Traffic Analysis Report

Based on your TCP message rate and your message object sizes your system will put about 16Mbits/sec of traffic onto the network. Almost any traffic amount is OK within a datacenter or between major JPMC data centers, but care should be used when transmitting between sites that are not major data centers since message traffic can saturate network links if it's large.

ExpressAnalytics – Model 5 Input

910

Market Data Distribution Analysis Tool

1. Hop Configuration

How many hops are in the route from source to consumers? 10

2. Route Length

What's the measured round-trip-time from source to consumer (msec)? 50

3. Message Sizes

What size are individual messages (bytes)? 1000

4. Transport Protocol (check one)

☐ TCP is used to send to consumers

☑ UDP is used to send to consumers

Submit for Analysis

930

920

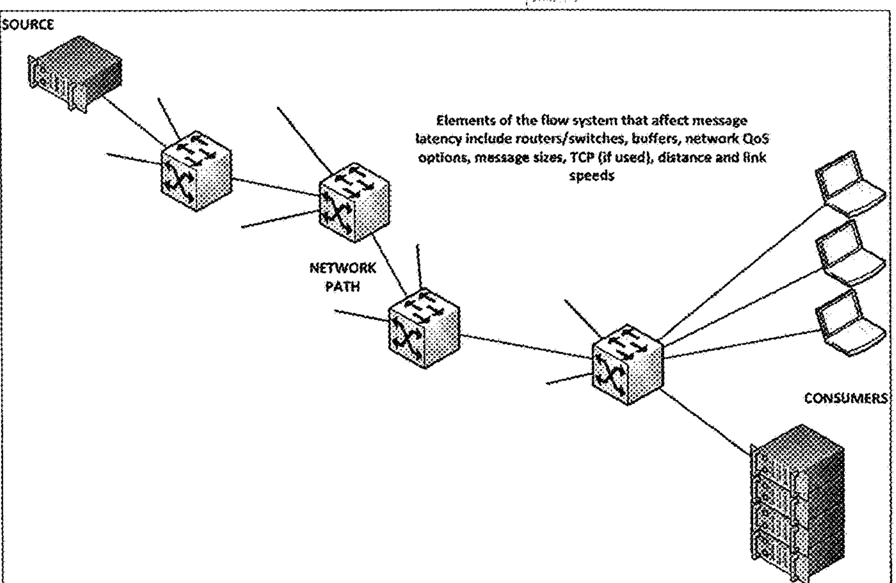

Figure 9B:
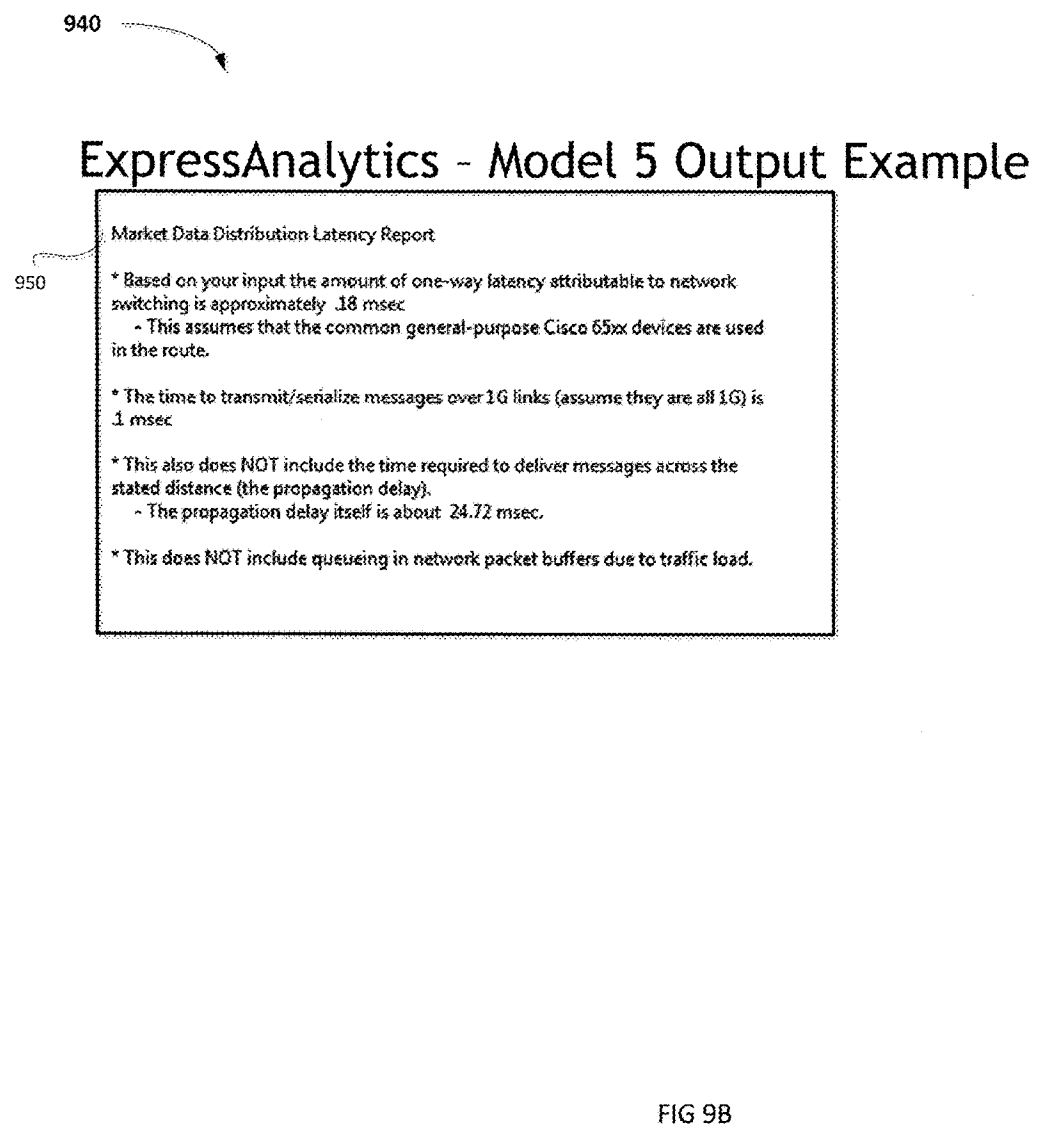

ExpressAnalytics – Model 5 Output Example

950

Market Data Distribution Latency Report

* Based on your input the amount of one-way latency attributable to network switching is approximately .18 msec
  - This assumes that the common general-purpose Cisco 65xx devices are used in the route.

* The time to transmit/serialize messages over 1G links (assume they are all 1G) is .1 msec

* This also does NOT include the time required to deliver messages across the stated distance (the propagation delay).
  - The propagation delay itself is about 24.72 msec.

* This does NOT include queueing in network packet buffers due to traffic load.

ExpressAnalytics - Model 6 Input

1010

Streaming Traffic Analysis Tool

1. What's the round-trip time between your end-points?

50 msec round-trip (reported by ping for example)

2. Streamed message object sizes

70 Kbytes per message (we could put a distribution around a mean but it's easier to just use high and low runs)

3. TCP Inter-message timing 500 msec between message sends on the same TCP connection (blank if not used)

4. UDP Messaging Rate 500 msec between message sends (blank if not used)

Submit for Analysis

1030

1020

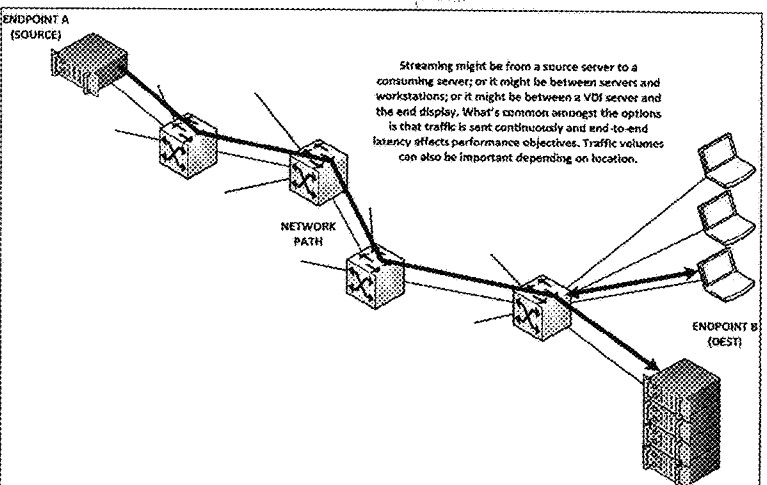

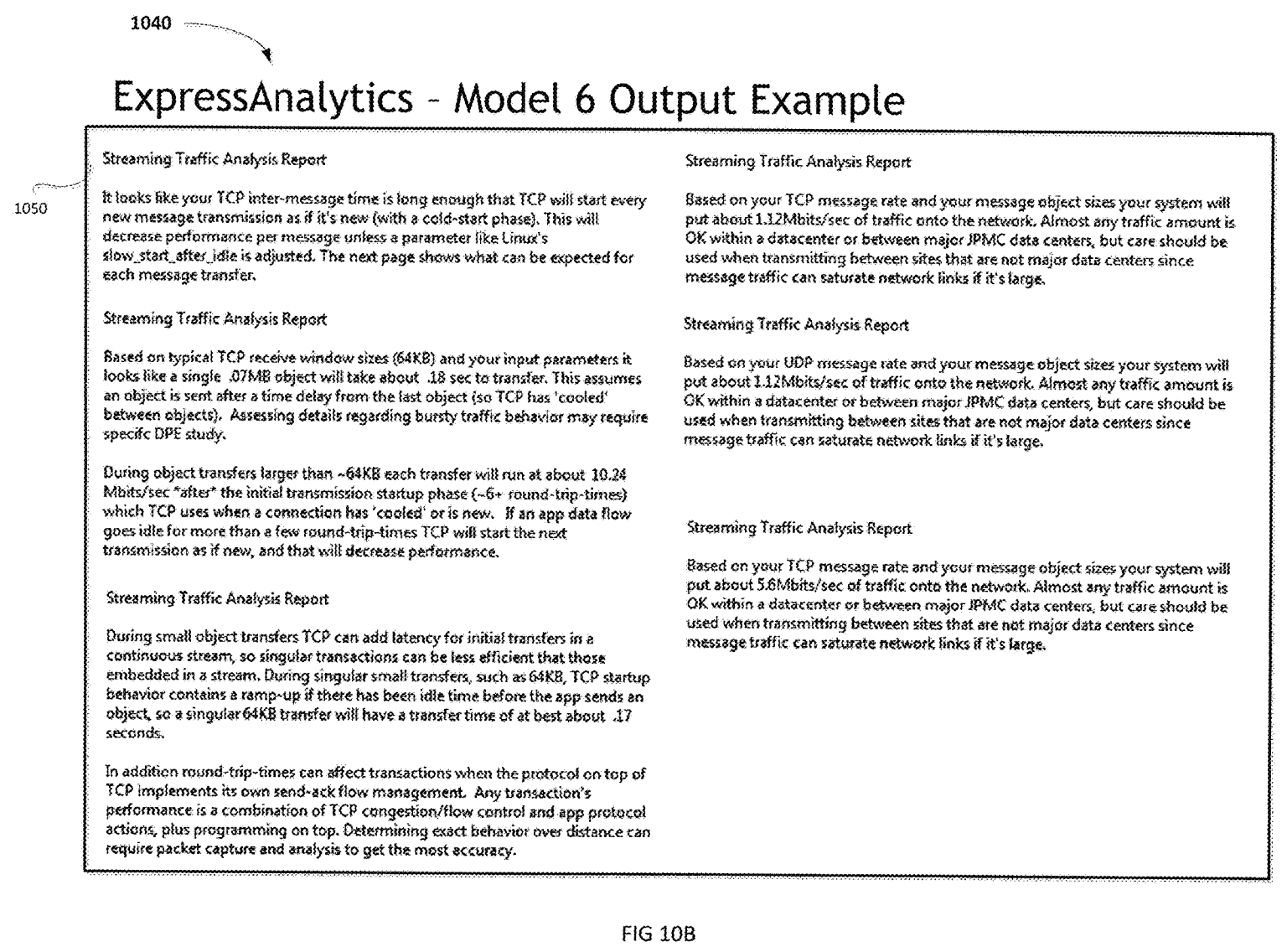

ExpressAnalytics - Model 6 Output Example

1050

Streaming Traffic Analysis Report

It looks like your TCP inter-message time is long enough that TCP will start every new message transmission as if it's new (with a cold-start phase). This will decrease performance per message unless a parameter like Linux's slow_start_after_idle is adjusted. The next page shows what can be expected for each message transfer.

Streaming Traffic Analysis Report

Based on typical TCP receive window sizes (64KB) and your input parameters it looks like a single .07MB object will take about .18 sec to transfer. This assumes an object is sent after a time delay from the last object (so TCP has 'cooled' between objects). Assessing details regarding bursty traffic behavior may require specific DPE study.

During object transfers larger than ~64KB each transfer will run at about 10.24 Mbits/sec *after* the initial transmission startup phase (~6+ round-trip-times) which TCP uses when a connection has 'cooled' or is new. If an app data flow goes idle for more than a few round-trip-times TCP will start the next transmission as if new, and that will decrease performance.

Streaming Traffic Analysis Report

During small object transfers TCP can add latency for initial transfers in a continuous stream, so singular transactions can be less efficient that those embedded in a stream. During singular small transfers, such as 64KB, TCP startup behavior contains a ramp-up if there has been idle time before the app sends an object, so a singular 64KB transfer will have a transfer time of at best about .17 seconds.

In addition round-trip-times can affect transactions when the protocol on top of TCP implements its own send-ack flow management. Any transaction's performance is a combination of TCP congestion/flow control and app protocol actions, plus programming on top. Determining exact behavior over distance can require packet capture and analysis to get the most accuracy.

Streaming Traffic Analysis Report

Based on your TCP message rate and your message object sizes your system will put about 1.12Mbits/sec of traffic onto the network. Almost any traffic amount is OK within a datacenter or between major JPMC data centers, but care should be used when transmitting between sites that are not major data centers since message traffic can saturate network links if it's large.

Streaming Traffic Analysis Report

Based on your UDP message rate and your message object sizes your system will put about 1.12Mbits/sec of traffic onto the network. Almost any traffic amount is OK within a datacenter or between major JPMC data centers, but care should be used when transmitting between sites that are not major data centers since message traffic can saturate network links if it's large.

Streaming Traffic Analysis Report

Based on your TCP message rate and your message object sizes your system will put about 5.6Mbits/sec of traffic onto the network. Almost any traffic amount is OK within a datacenter or between major JPMC data centers, but care should be used when transmitting between sites that are not major data centers since message traffic can saturate network links if it's large.

FIG 10B

APPLICATION AND INFRASTRUCTURE PERFORMANCE ANALYSIS AND FORECASTING SYSTEM AND METHOD

RELATED APPLICATIONS

This application is a continuation application of U.S. patent application Ser. No. 14/513,873, filed on Oct. 14, 2014.

TECHNICAL FIELD

Embodiments of the present invention are directed to a system and method for application and infrastructure analysis and forecasting with the goal of improving the performance of the application and infrastructure and reducing complexity of analyzing such performance.

BACKGROUND OF THE INVENTION

When applications and/or systems are developed and deployed onto an enterprise network infrastructure, system performance often suffers if an application has been designed without careful regard for distance between tiers, underlying transport protocols, message flows, network configuration and dynamics, etc. Similarly when new systems are placed onto the network, their configuration often needs to be managed or optimized to obtain the performance required. Furthermore, during system configuration and deployment, often times there is a need for quantification of the performance that can be expected from the system configuration.

Existing commercial products let an expert study the impact of various system design parameters, such as, distance between tiers, underlying transport protocols, application parameters, etc., on the final performance of an application system. However, these commercial products require advanced expertise in system design and configuration from the interacting user. As a result, the existing products are far more involved to use and cannot be readily leveraged by application designers or deployment engineers.

Thus, there is a need for an application and infrastructure performance analysis and forecasting system that bridges the gap between the consumers of the analysis (application designers and deployment engineers) and the expertise embodied in the invention. That is, there is a need for a comprehensive and easy-to-use application and infrastructure performance analysis and forecasting system that provides the same advisory expertise for application designers and deployment engineers, as can be used by experts with advanced knowledge in this field.

BRIEF SUMMARY OF THE INVENTION

In accordance with exemplary embodiments of the present invention, there is provided a computer implemented application and infrastructure performance analysis and forecasting system for improving the performance of at least one application and infrastructure and reducing the complexity of analyzing such performance. In one aspect of the invention, the system implements a computer processor accessing at least one storage medium and comprises a web dashboard for receiving infrastructure input from a user regarding application and infrastructure configuration and at least one performance objective using a user interface at a display device. A modeling engine may then use the infrastructure input(s) and the performance objective(s) provided by the user to determine at least one application and infrastructure performance model. For each application and infrastructure performance model identified by the modeling engine, the system may receive model specific input from the user using a web dashboard. A model computation engine may then compute model specific output for each application and infrastructure performance model based on the model specific input, infrastructure input, and the performance objectives. The model specific input may then be displayed to the user at a web dashboard.

In a further aspect of the invention, a computer implemented application and infrastructure performance analysis and forecasting method is provided for improving the performance of at least one application and infrastructure and reducing the complexity of analyzing such performance using an application and infrastructure performance analysis and forecasting system implementing a computer processor accessing at least one storage medium. The method receives infrastructure input from a user regarding application and infrastructure configuration and at least one performance objective using a user interface at a display device. A modeling engine may then use the infrastructure input(s) and the performance objective(s) provided by the user to determine at least one application and infrastructure performance model. For each application and infrastructure performance model identified by the modeling engine, the method may receive model specific input from the user using a web dashboard. A model computation engine may then compute model specific output for each application and infrastructure performance model based on the model specific input, infrastructure input, and the performance objectives. The model specific input may then be displayed to the user at a web dashboard.

BRIEF DESCRIPTION OF THE DRAWINGS

The present invention is described in detail below with reference to the attached drawings figures, wherein:

FIG. 4A is a user interface illustrating a Web Dashboard of an Application and Infrastructure Performance Analysis and Forecasting System in accordance with an embodiment of the invention;

FIG. 4B is a user interface illustrating a Web Dashboard of an Application and Infrastructure Performance Analysis and Forecasting System in accordance with an embodiment of the invention;

FIG. 5A is a user interface illustrating a Web Dashboard of an Application and Infrastructure Performance Analysis and Forecasting System in accordance with an embodiment of the invention;

FIG. 5B is a user interface illustrating a Web Dashboard of an Application and Infrastructure Performance Analysis and Forecasting System in accordance with an embodiment of the invention;

FIG. 6A is a user interface illustrating a Web Dashboard of an Application and Infrastructure Performance Analysis and Forecasting System in accordance with an embodiment of the invention;

FIG. 6B is a user interface illustrating a Web Dashboard of an Application and Infrastructure Performance Analysis and Forecasting System in accordance with an embodiment of the invention;

FIG. 7A is a user interface illustrating a Web Dashboard of an Application and Infrastructure Performance Analysis and Forecasting System in accordance with an embodiment of the invention;

FIG. 7B is a user interface illustrating a Web Dashboard of an Application and Infrastructure Performance Analysis and Forecasting System in accordance with an embodiment of the invention;

FIG. 8A is a user interface illustrating a Web Dashboard of an Application and Infrastructure Performance Analysis and Forecasting System in accordance with an embodiment of the invention;

FIG. 8B is a user interface illustrating a Web Dashboard of an Application and Infrastructure Performance Analysis and Forecasting System in accordance with an embodiment of the invention;

FIG. 9A is a user interface illustrating a Web Dashboard of an Application and Infrastructure Performance Analysis and Forecasting System in accordance with an embodiment of the invention;

FIG. 9B is a user interface illustrating a Web Dashboard of an Application and Infrastructure Performance Analysis and Forecasting System in accordance with an embodiment of the invention;

FIG. 10A is a user interface illustrating a Web Dashboard of an Application and Infrastructure Performance Analysis and Forecasting System in accordance with an embodiment of the invention;

FIG. 10B is a user interface illustrating a Web Dashboard of an Application and Infrastructure Performance Analysis and Forecasting System in accordance with an embodiment of the invention.

DETAILED DESCRIPTION OF PREFERRED EMBODIMENTS

Embodiments of the present invention are directed to a system and method for an Application and Infrastructure Performance Analysis and Forecasting Manager that improves the performance of an application and corresponding infrastructure, and further reduces the complexity of analyzing such performance. The system and method receive input from the user regarding their system configuration and performance objectives. Based on the user input, the system and method decide which application and infrastructure performance model to apply to the user's system. For each identified model, the system and method then gather model-specific input(s) from the user. The system and method then calculate model-specific results and display them to the user.

Figure 1A:
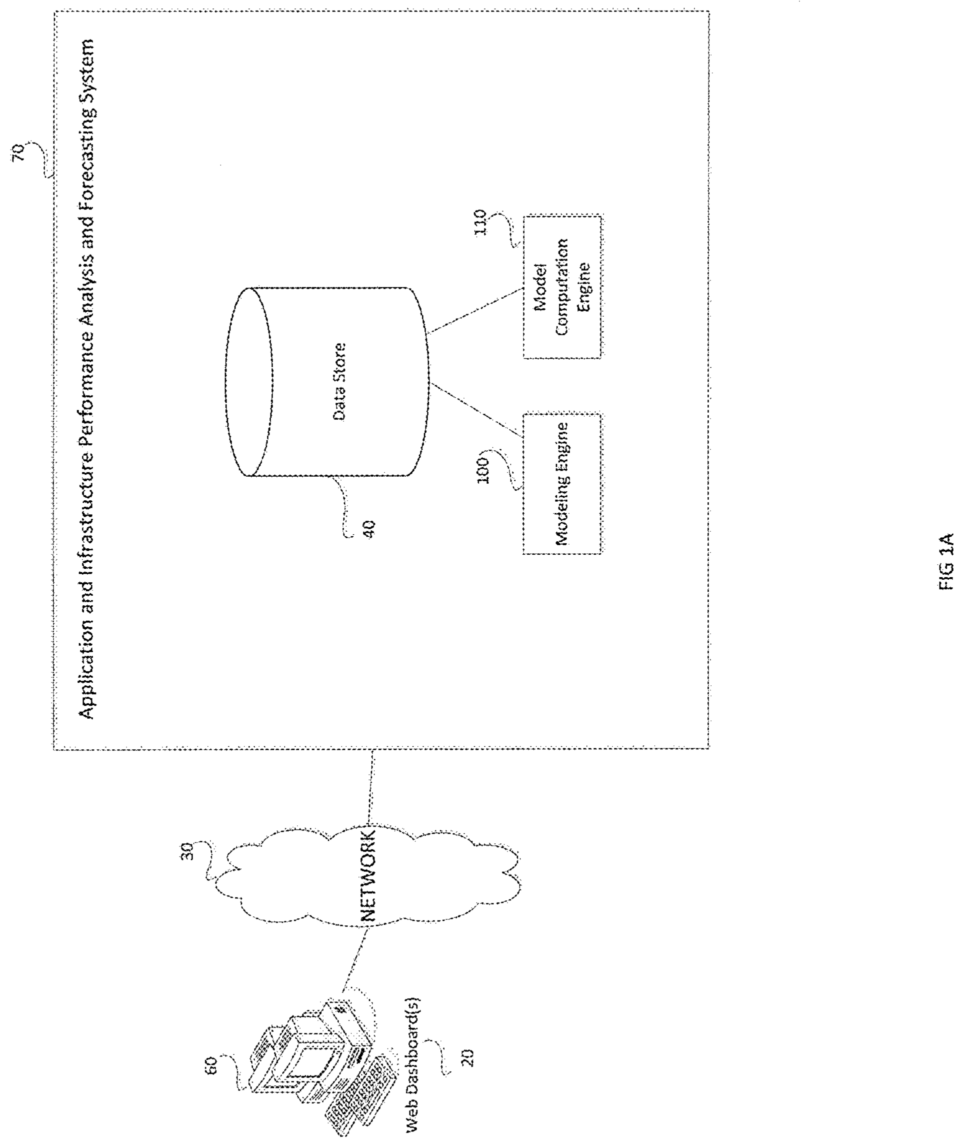
FIG. 1A is a block diagram illustrating an operating environment for an Application and Infrastructure Performance Analysis and Forecasting System in accordance with an embodiment of the invention.

FIG. 1A is a block diagram illustrating an operating environment for an Application and Infrastructure Performance Analysis and Forecasting System in accordance with an embodiment of the invention. The Application and Infrastructure Performance Analysis and Forecasting System 70 is connected through a communications medium over a Network 30, such as the internet, an intranet, a local-area-network (LAN), a wide-area-network (WAN), etc., to one or more Web Dashboard(s) 20 at one or more Display Device(s) 60. The Web Dashboard(s) 20 may allow a user to enter information regarding application and infrastructure configuration, performance objective(s), and model-specific details.

The Application and Infrastructure Performance Analysis and Forecasting System 70 includes a Data Store 40, a Modeling Engine 100, and a Model Computation Engine 110. In an embodiment of the invention, the Data Store 40 may be a database that is local to the Application and Infrastructure Performance Analysis and Forecasting System 70 and that stores data to be used by the Application and Infrastructure Performance Analysis and Forecasting System 70 to perform the performance optimization of an application and infrastructure.

A user may access the Web Dashboard 20 using a web browser. In an embodiment of the invention, a user is prompted to provide authentication information before access to the Web Dashboard 20 is granted. Examples of authentication information include, but are not limited to, username, user id, password, biometrics, etc. Once a user is authenticated, he/she may be able to perform several actions using the Web Dashboard(s) 20. For example, a user may be able to enter information regarding their system configuration and performance objectives. A Web Dashboard for receiving information regarding system configuration and performance objectives is described in greater detail in reference with FIGS. 4A and 4B.

After receiving such input, the Modeling Engine 100 may determine at least one application and infrastructure performance model to perform performance analysis and forecasting of the user's system configuration. The Modeling Engine 100 may consider one or more factors in determining which application and infrastructure performance model to present to the user. Examples of such factors include, but are not limited to, system design, performance requirements, and system configuration. The Modeling Engine 100 may also make one or more assumptions when determining which application and infrastructure performance model to present to the user. Examples of assumed information include, but are not limited to, default values for one or more system design and/or configuration items, calculated values based on one or more user input items, etc. The Modeling Engine 100 may also determine the application and infrastructure performance model based on default values, prior input received from the user, user response history, etc.

For each application and infrastructure performance model identified by the Modeling Engine 100, the user may be presented with one or more Web Dashboard(s) 20 to gather additional information specific to each model. Examples of Web Dashboard(s) 20 for receiving information regarding each application and infrastructure performance model are described in greater detail in reference with FIGS. 5A, 6A, 7A, 8A, 9A, and 10A. After receiving model-specific input from the user, the Model Computation Engine 110 may compute model-specific output. The model specific output may be based on one or more inputs received from the user. The model specific output may also be based on assumed information. Examples of assumed information include, but are not limited to, default values for one or more system design and/or configuration items, calculated values based on one or more user input items, etc. The model specific output may then be displayed at one or more Web Dashboard(s) 20. Examples of Web Dashboard(s) 20 for displaying model specific outputs are described in greater detail in reference with FIGS. 5B, 6B, 7B, 8B, 9B, and 10B.

In an embodiment of the invention, the Model Computation Engine 110 may evaluate the performance objectives provided by the user to determine one or more system design and/or system configuration parameters that may be modified to optimize the performance objectives. For example, if the user specifies a performance objective for a message round-trip time, the Model Computation Engine 110 may determine, based on the initial system design and configuration information, as well as the desired message round-trip time, one or more system design and/or configuration parameters (e.g., placement of transfer-end-points, transfer protocol to use, server parameters, etc.) that may be modified to achieve the desired performance objective. In an embodiment of the invention, the Model Computation may determine one or more of the following system design and/or system configuration parameters based on the performance objectives provided by the user: proper locations for application end-points (for example, which data centers to put application components into), maximum network route size/hops to assure messages delivery meets performance objectives, maximum network end-to-end latency that can be tolerated in meeting performance objectives, required network switch latencies given a route hop count and distances over the network route, minimum network bandwidth required to carry the application traffic over the network, and TCP window sizes required to meet performance objectives.

Figure 1B:
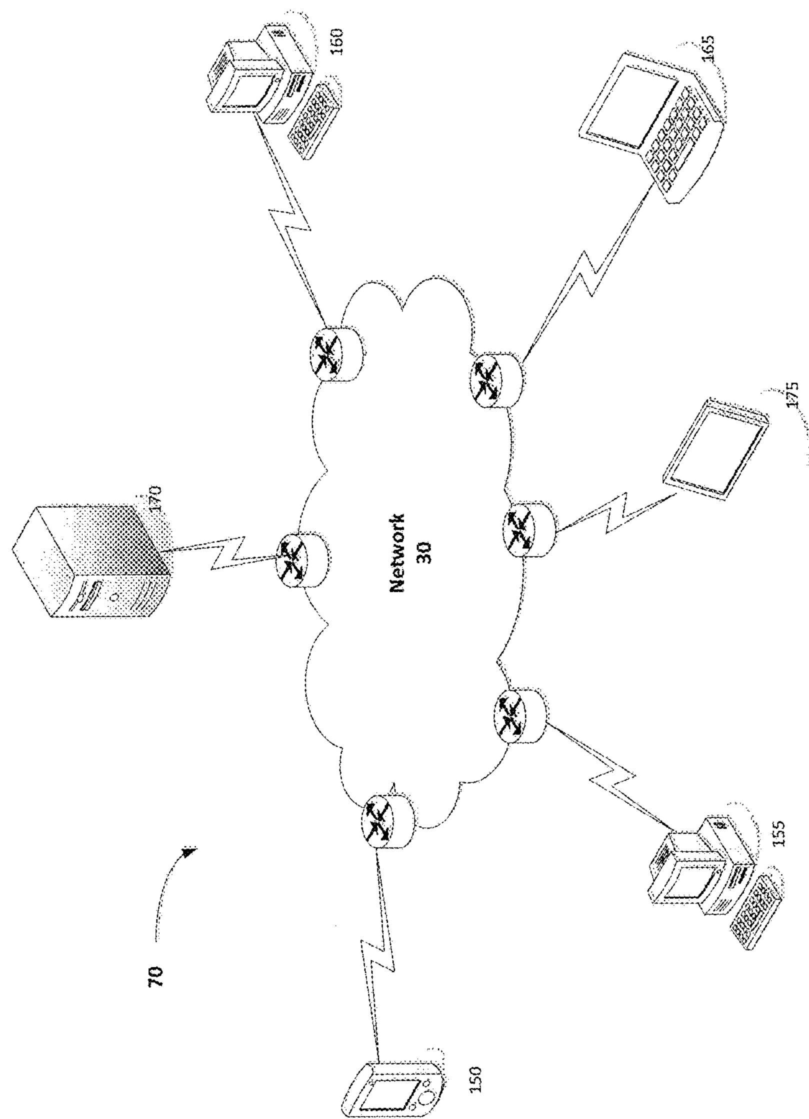
FIG. 1B is a block diagram illustrating an operating environment for an Application and Infrastructure Performance Analysis and Forecasting System in accordance with an embodiment of the invention.

FIG. 1B is a block diagram illustrating an operating environment for Application and Infrastructure Performance Analysis and Forecasting System 70 in accordance with an embodiment of the invention. Those skilled in the art will appreciate that the invention may be practiced with various computer system configurations, including hand-held wireless devices such as mobile phones, smart phones or Personal Digital Assistants (PDAs) 150, multiprocessor systems 155, microprocessor-based or programmable consumer electronics 160, minicomputers 165, mainframe computers 170, Tablets (iPad™, Samsung Galaxy™, etc.) 175, and the like. The invention may also be practiced in distributed computing environments where tasks are performed by remote processing devices that are linked through a communications network 30. In a distributed computing environment, program modules may be located in both local and remote computer storage media including memory storage devices.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Figure 2:
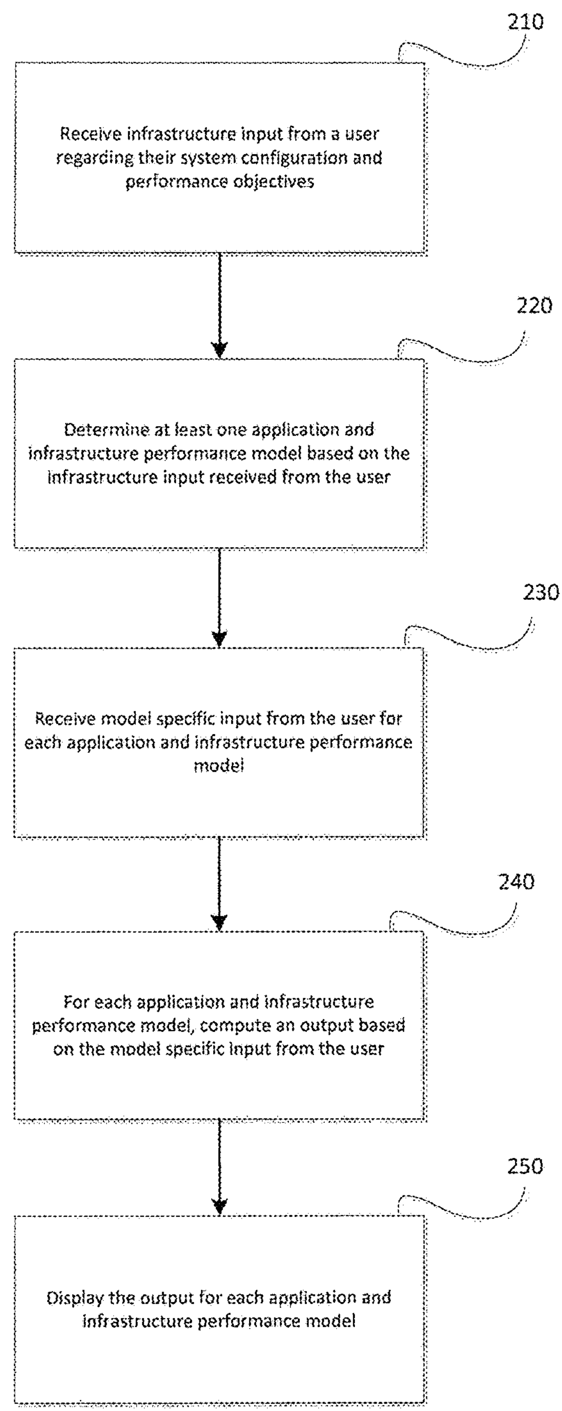
FIG. 2 is a flow chart illustrating a method for an Application and Infrastructure Performance Analysis and Forecasting method in accordance with an embodiment of the invention.

FIG. 2 is a flow chart illustrating a method for Application and Infrastructure Performance Analysis and Forecasting in accordance with an embodiment of the invention. The method begins at step 210 by receiving infrastructure input from a user regarding their system configuration and performance objectives. Examples of infrastructure input include, but are not limited to, system design, system configuration, and performance objectives. After receiving the infrastructure input from the user, the method determines, in step 220, at least one application and infrastructure performance model. Examples of application and infrastructure performance models include, but are not limited to, user response time model, bulk transfer model, message queue and database response time model, message delay and variation model, market data distribution model, and streaming model. The application and infrastructure performance model may be determined based on the infrastructure input provided by the user. The application and infrastructure performance model may also be determined based on default values, prior input received from the user, user response history, etc.

After determining at least one application and infrastructure performance model, the method, in step 230 receives model specific input from the user for each application and infrastructure performance model. Examples of model specific input include, but are not limited to, user-server configuration, round-trip time between transfer end points, number of objects sent to transfer end points, number of objects comprising a response, location of transfer end points, size of information being transferred, transfer time requirements, application used for transfer of data between transfer end points, size of at least one object transferred between transfer end points, information transfer protocol, mode of dataflow operation between transfer end times, information transfer rate, number of hops between transfer end points, measured round trip time between transfer end points, and type of information transfer. Examples of Web Dashboard(s) 20 for receiving information regarding each application and infrastructure performance model are described in greater detail in reference with FIGS. 5A, 6A, 7A, 8A, 9A, and 10A. In an embodiment of the invention, the model specific parameters for each application and infrastructure performance model may be obtained from memory (for example, a database).

The method may then compute, at step 240, at least one output for each application and infrastructure performance model using a Model Computation Engine. The model specific output may be based on one or more inputs received from the user. The inputs received from the user may be system design information, system configuration information, performance objective(s), and model specific input. The model specific output may also be based on assumed information. Examples of assumed information include, but are not limited to, default values for one or more system design and/or configuration items, calculated values based on one or more user input items, etc. The method may then display, at step 250, model specific output at one or more Web Dashboard(s) 20. The output may be numerical, visual, or audial. Examples of Web Dashboard(s) 20 for displaying model specific outputs are described in greater detail in reference with FIGS. 5B, 6B, 7B, 8B, 9B, and 10B. In an embodiment of the invention, the method transmits the model specific output to one or more remote locations over a network.

In an embodiment of the invention, the Model Computation Engine may evaluate the performance objectives provided by the user to determine one or more system design and/or system configuration parameters that may be modified to optimize the performance objectives. For example, if the user specifies a performance objective for a message round-trip time, the Model Computation Engine may determine, based on the initial system design and configuration information, as well as the desired message round-trip time, one or more system design and/or configuration parameters (e.g., placement of transfer-end-points, transfer protocol to use, server parameters, etc.) that may be modified to achieve the desired performance objective. In an embodiment of the invention, the Model Computation may determine one or more of the following system design and/or system configuration parameters based on the performance objectives provided by the user: proper locations for application end-points (for example, which data centers to put application components into), maximum network route size/hops to assure messages delivery meets performance objectives, maximum network end-to-end latency that can be tolerated in meeting performance objectives, required network switch latencies given a route hop count and distances over the network route, minimum network bandwidth required to carry the application traffic over the network, and TCP window sizes required to meet performance objectives.

Figure 3:
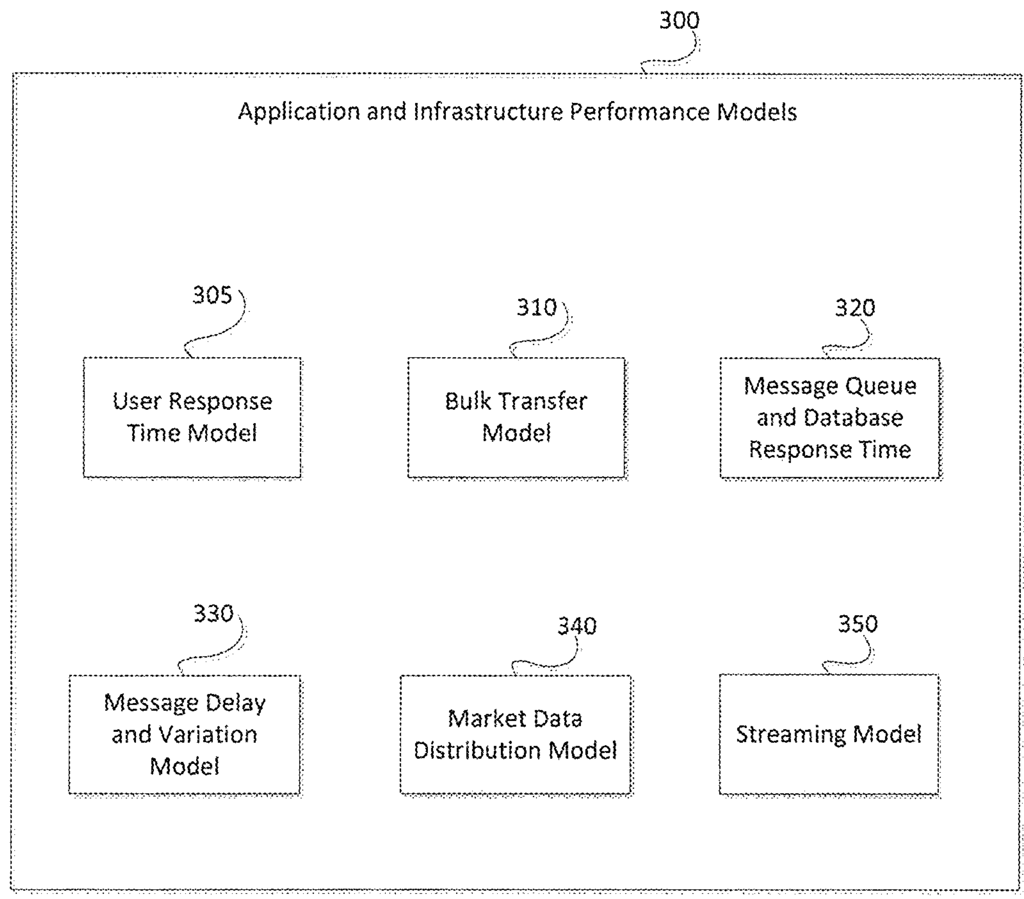
FIG. 3 is a block diagram illustrating various Application and Infrastructure Performance Models in accordance with an embodiment of the invention.

FIG. 3 is a block diagram illustrating various Application and Infrastructure Performance Models 300 in accordance with an embodiment of the invention. Examples of application and infrastructure performance model include, but are not limited to, User Response Time Model 305, Bulk Transfer Model 310, Message Queue And Database Response Time Model 320, Message Delay And Variation Model 330, Market Data Distribution Model 340, and Streaming Model 350. The User Response Time Model 305 predicts the performance for web-page-like user transactions where the user operates a web-page or other client application that communicates with servers to complete a function. The User Response Time Model 305 may calculate the performance to be expected for elements of completing a user transaction against the servers. The Bulk Transfer Model 310 determines the amount of time required to transfer/copy large data blocks between transfer end points. It may also determine the amount of traffic that will be placed on the network by the transfers and advise on the impact of different transfer protocols. The Message Queue And Database Response Time Model 320 addresses the operation of messaging streams for message-queue or database queries as they traverse the network and are affected by flow-control and the network route and configuration. It may predict the time required to send messages and the volume of traffic they will generate on the network. It may also encompass the impact of TCP flow control on performance. The Message Delay And Variation Model 330 addresses the flow of objects from source to destination end points and focuses on the basic transfer of objects of a given size with time between messages. It may show how flow-control will affect message delivery times and how much traffic the messages add to the network. The Market Data Distribution Model 340 analyzes the performance of market data streaming from source to destination end points. It may advise the user about the impact of network hops on the source-to-destination message delivery latency and how much flow-control will impact performance. It may also advise regarding the impact of serialization latencies on end-to-end delivery times. The Streaming Model 350 predicts the performance when messages are streamed from source to destination end points using TCP and/or UDP protocols. It may include estimates on network traffic levels and message transfer times.

The User Response Time Model 305 may use the following information: location of transfer end points, network round-trip time, object size and number sent during a transaction between a user computer and a server, whether objects are sent in parallel or sequentially to the server, and whether objects are sent in parallel or sequentially from the server to the user. The User Response Time Model 305 may then, for each scenario of transmission to or from the server, calculate the time to transfer an object. The User Response Time Model 305 may also compute a transfer rate for the transmission. In an embodiment of the invention, the User Response Time Model 305 may use an analytic model of the Transmission Control Protocol/Internet Protocol (TCP/IP) transmission process to compute a model specific output. The TCP/IP transmission process may calculate the transmission time duration for an application object from a TCP/IP source to a destination. The TCP/IP transmission process may take into account at least the round-trip-time and TCP receive window size. The TCP/IP transmission process may also include packet loss probabilities pertaining to the network route and any bottleneck links in the network route. The TCP/IP transmission process may assume information such as, TCP/IP receive window, network round-trip time, object size to be sent between the transfer end-points, etc. Based on the TCP/IP transmission process calculations, the User Response Time Model 305 may then compute one or more metrics that may be produced to compute model specific output. Examples of some metrics are depicted below:

Slope=(64000*8/measured network round-trip time between transfer end-points)/(6*measured network round-trip time between transfer end-points)

$Tput_{avg}$ (Throughput)=object size*8/(Time spent in steady-state phase after ramp-up+Time for the TCP/IP ramp-up process)

If object size*8<=Amount sent during linear ramp-up, then

Object Transmission Time=square-root(2*object size*8/Slope)

If object size>Amount sent during linear ramp-up, then

Object Transmission Time=Time spent in steady-state phase after ramp-up+Time for the TCP/IP ramp-up process The User Response Time Model 305 may calculate the time that will be required for the sending and receiving portions of a transaction. For example, if the transfers for the sending direction are sequential, then the User Response Time Model 305 may model the transfers as one long TCP/IP transmission. If the transfers for the sending direction are parallel, then the User Response Time Model 305 may model them as concurrent individual TCP/IP transmissions. Similar calculations may be performed for the receiving direction. The User Response Time Model 305 may compute the transfer duration as the sum of the time that will be required for sending duration and the time that will be required for receiving. The User Response Time Model 305 may also calculate a transaction run-time as the sum of the transfer duration and idle time, that is, time between transactions. The User Response Time Model 305 may also calculate the impact on the network by computing one or more outputs. Examples of such output may include: average traffic sent per user transaction, average traffic per user, average traffic received per user transaction, and network traffic. The outputs may be computed as follows:

Average Traffic Sent Per User Transaction=Sent Object Size*Number Sent/Transaction Run-Time Average Traffic Per User=Average Traffic Sent Per User Transaction*transaction rate(transactions/second)

Average Traffic Received Per User Transaction=Received Object Size*Number Received/Transaction Run-Time Network Traffic=Population Size*Average Traffic Per User The User Response Time Model 305 may then generate one or more model specific outputs. Examples of User Response Time Model specific output include, but are not limited to, the time required to complete the transmission portion of a user transaction, and advice on traffic volumes the transaction will generate when driven by a population of users. An example of a model-specific output for a Message Queue And Database Response Time Model 320 is described in greater detail in reference with FIG. 5B.

The Bulk Transfer Model 310 may use the following information: location of transfer end points, network round-trip time, transfer size, whether there is a transfer-time requirement, and the application or protocol used for the transfer. Examples of application or protocols used for the transfer include, but are not limited to, File Transfer Protocol (FTP), backup appliances, Windows copies operations (xcopy, robocopy), WebSphere MQ-based file transfer, secure copy, bulk transfer, or other proprietary and/or commercial applications or protocols, etc. In an embodiment of the invention, the Bulk Transfer Model 310 may then compute data-rate (throughput) during a steady-state phase based on a TCP/IP transmission process.

Figure 11:
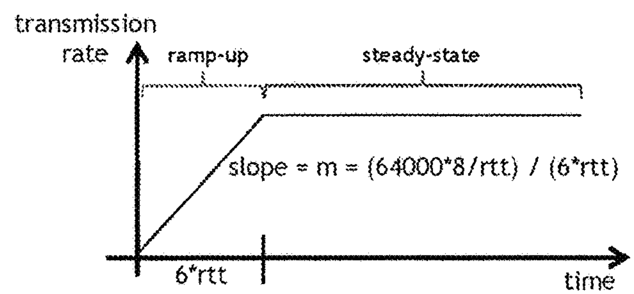
FIG. 11 is a graph of TCP/IP transmission model.

In an embodiment of the invention, the Bulk Transfer Model 310 may compute the following metrics based on a TCP/IP transmission model shown in FIG. 11.

where, rtt=measured network round-trip-time between connection end-points

RWS=TCP/IP receive window size in bytes as advertised by the receiver=64000 as per the common TCP default value $\text{Tput}_{ss}$ (data-rate (throughput) during the steady-state phase)=RWS*8/rtt $T_{ramp\text{-}up}$ (time for the TCP/IP ramp-up process)=6*rtt $X_{ramp\text{-}up}$ (amount sent during the linear ramp-up)=(½)*$T_{ramp\text{-}up}$*$\text{Tput}_{ss}$=1.536Mbits (for example)

$X_{ss}$ (amount sent during the steady-state phase of transmission)=object size*8−$X$ramp-up $T_{ss}$ (time sent in the steady-state phase after ramp-up)=$X_{ss}$/$\text{Tput}_{ss}$ If object size*8<=Amount sent during linear ramp-up, then Object Transmission Time=square-root(2*object size*8/Slope)

If object size>Amount sent during linear ramp-up, then

Object Transmission Time=Time spent in steady-state phase after ramp-up+Time for the TCP/IP ramp-up process The Bulk Transfer Model 310 may further calculate the time that will be required for the object transfer. For example, if the transfers for the sending direction are sequential, then the Bulk Transfer Model 310 may model the transfers as one long TCP/IP transmission. If the transfers for the sending direction are parallel, then the Bulk Transfer Model 310 may model them as concurrent individual TCP/IP transmissions. Similar calculations may be performed for the receiving direction. The Bulk Transfer Model 310 may compute the transfer duration as the sum of the time that will be required for sending duration and the time that will be required for receiving. The Bulk Transfer Model 310 may also calculate a transaction run-time as the sum of the transfer duration and idle time, that is, time between transactions. The Bulk Transfer Model 310 may further compute the network traffic as equivalent to the steady-state throughput for the duration of the transfer.

The Bulk Transfer Model 310 may then generate one or more model specific outputs. Examples of Bulk Transfer Model specific output include, but are not limited to, the time to transfer an object using specified and default setting parameters, advice on whether or not the transfer of the specified bulk data will saturate network links, advice on whether or not FTP will handle the transfer size and whether or not traffic throttles should be used. An example of a model-specific output for a Bulk Transfer Model 310 is described in greater detail in reference with FIG. 6B.

The Message Queue And Database Response Time Model 320 may use the following information: location of transfer end points, network round-trip time, whether messaging is synchronous/sequential versus asynchronous/parallel/overlapping, and message size estimates. The Message Queue And Database Response Time Model 320 may calculate one or more metrics based on a TCP/IP transmission process. Examples of some metrics are depicted below:

Slope=(64000*8/measured network round-trip time between transfer end-points)/(6*measured network round-trip time between transfer end-points)

$\text{Tput}_{avg}$ (Throughput)=message size* 8/(Time spent in steady-state phase after ramp-up+Time for the TCP/IP ramp-up process)

If message size*8<=Amount sent during linear ramp-up, then

Message Transmission Time=square-root(2*message-size*8/Slope)

If message size>Amount sent during linear ramp-up, then

Message Transmission Time=Time spent in steady-state phase after ramp-up+Time for the TCP/IP ramp-up process Where messages are contained in a continuous stream, $\text{Tput}_{avg}$ (Throughput)=TCP/IP receive window size*8/measure network round-trip time between transfer end-points The Message Queue And Database Response Time Model 320 may calculate the time to send a message using the above formulae if messaging is synchronous/sequential. The time to send a singular message, that is, the message-transmission time, may be computed as message size/throughput. The throughput may be the throughput during steady-state. In an embodiment of the invention, the throughput may be the average throughput. The messaging rate may be 1/message-transmission time In an embodiment of the invention, if asynchronous/batching of messages is used, the message transmission time may be calculated using the above formulae but the traffic patterns may contain overlapping transfer. The message transmission time to send a singular message may be computed as message-size/throughput. The data rate when a message is being transmitted, the intra-messaging data rate, may be computed as the throughput. The throughput may be the throughput during steady-state. In an embodiment of the invention, the throughput may be the average throughput.

The Message Queue And Database Response Time Model 320 may then generate one or more model specific outputs. Examples of Message Queue And Database Response Time Model specific output include, but are not limited to, the time to transfer a message of specified size (message transmission time) based on presumed default setting parameters and user-specified message size, intra-messaging data rate of the network, the messaging rate that can be achieved if the messaging is synchronous/sequential, etc. An example of a model-specific output for a Message Queue And Database Response Time Model 320 is described in greater detail in reference with FIG. 7B.

The Message Delay and Variation Model 330 may use the following information: network round-trip time, transfer protocol (e.g., TCP, User Datagram Protocol (UDP), etc.), inter-message time for messages within a stream, and message size estimates. The Message Delay and Variation Model 330 may model streaming flow by computing several metrics. The metric computations may depend on the transport protocol used in the network route. For example, if UDP is used, the following computations may be utilized:

Data Rate=message-size/inter-message-time

The data range may then be reported to the user along with one or more warnings about link saturation if data-rate exceeds links speeds in the network route.

In an embodiment of the invention, if TCP is used, and the inter-message-time is greater than twice of the round-trip-time, a warning flag may be set. The object transmission time may be calculated as follows:

If streaming message size*8<=Amount sent during linear ramp-up, then

Object Transmission Time=square-root(2* streaming message size*8/Slope)

If streaming message size>Amount sent during linear ramp-up, then

Object Transmission Time=Time spent in steady-state phase after ramp-up+Time for the TCP/IP ramp-up process In an embodiment of the invention, if the object transmission time is greater than the inter-message-time, then a warning may sent to the user that either there need to be concurrent overlapping TCP connections so that messages can be sent concurrently OR a queue will build up in the sender end-system (server/PC) because messages are being generate faster than TCP can deliver them.

The Message Delay and Variation Model 330 may further compute the steady-state throughput as follows:

$Tput_{ss}$ (Throughput)=TCP/IP receive window size*8/measure network round-trip time between transfer end-points The Message Delay and Variation Model 330 may further compute how long it may take to transmit 64 Kb, that is, the 64 Kb transmission time. The 64 Kb transmission time may be computed as follows:

64 KB transmission time=square-root(2*64000*8/m), where m=(64000*8/rtt)/(6*rtt) and rtt=round-trip-time between transfer end-points The Message Delay and Variation Model 330 may then generate one or more model specific outputs. Examples of Message Delay and Variation Model specific output include, but are not limited to, warnings on whether the message stream will have performance problems due to TCP slow starts, the time required to transmit the message size specified, warnings on the fact that the transmission time will be affected by whether or not the messages are long enough to overcome the TCP slow-start phase if the idle time between messages is larger than a couple-few round-trip-times, the data rate that can be achieved after TCP has reached its steady-state phase ($Tput_{ss}$), and a warning if the time between messages is greater than the time to send one message—indicating that a sending queue will build during stream operation. The Message Delay and Variation Model 330 may also report the data rate that the stream will place onto the network and warn that if this is higher than link speeds for the route that network congestion will occur. An example of a model-specific output for a Message Delay and Variation Model 330 is described in greater detail in reference with FIG. 8B.

The Market Data Distribution Model 340 may use the following information: number of hops in the route from source to consumers, network round-trip time, transfer protocol (e.g., TCP, UDP, etc.), and message size estimates. The Market Data Distribution Model 340 may model individual route hops by computing several metrics. Examples of metrics include, but are not limited to, the latency or delay in sending a message packet from the source to the consumer over a network route, the time to serialize or transmit a message packet over each hop/link in a network route, and switching delays due to network switches in the route. The time to serialize or transmit a message packet over each hop/link in a network route may be calculated by using the link speed for each hop/link in a network route and calculating the time to transmit a message from the source or network switch to the next recipient of a packet. The next recipient of the packet may be a network switch, a final message consumer, a server, or a processor. The Market Data Distribution Model 340 may then compute the serialization-time-per-hop using the following formula:

Serialization-time-per-hop (if the link is a 1Gigabit/second link)=minimum (maximum-possible message size, message size*1.15)*8/10**9

Other divisors may be used for different link speeds. The Market Data Distribution Model 340 may compute the switching delays due to network switches in the route using product information or other sources for the switch products used in the network route.

In an embodiment of the invention, the Market Data Distribution Model 340 may model the entire network route by computing several metrics. The metric computations may depend on the transport protocol used in the network route. For example, if the User Datagram Protocol (UDP) is used, the following computations may be utilized:

Total Serialization Time for the route=(number-of-hops+1)*serialization-time-per-hop, if each link is the same speed (1 Gbit/sec, for example)

Total Switching Latency for the route=number-of-hops*switching-delay-per-hop

In an embodiment of the invention, the Market Data Distribution Model 340 may calculate each route hop individually and then add them to determine the Total Serialization Time for the route.

In an embodiment of the invention, if the protocol is TCP, the following computations may be utilized:

Flow-controlled Message Delivery Time=message-size*8/throughput

Message Remainder (amount of the message which has not fit into the first network Maximum Transmission Unit (MTU) packets of size 1500 bytes)=message-size−1500*Int(message-size/1500), where Int(*a*/*b*) is the integer portion of *a*/*b*

Route Serialization Time for the Last Part of the Message=(number-of-hops+1)*message-remainder*8*1.15*10**9 (for 1 Gbit/sec links, for example)

Effective Serialization Time for the route=Flow-controlled Message Delivery Time+Route Serialization Time for the Last Part of the Message The Market Data Distribution Model 340 may then generate one or more model specific outputs. Examples of Market Data Distribution Model specific output include, but are not limited to, the amount of time spent transmitting/serializing the messages through the entire route, the amount of time spent in switching delays through the entire route, the amount of time spent traveling over distance (the one-way measured latency minus the sum of the above values), etc. An example of a model-specific output for a Message Queue And Database Response Time Model 320 is described in greater detail in reference with FIG. 9B.

The Streaming Model 350 may use the following information: network round-trip time, transfer protocol (e.g., TCP, User Datagram Protocol (UDP), etc.), inter-message time for messages within a stream, and message size estimates. The Streaming Model 350 may model streaming flow by computing several metrics. The metric computations may depend on the transport protocol used in the network route. For example, if UDP is used, the following computations may be utilized:

Data Rate=message-size/inter-message-time

The data range may then be reported to the user along with one or more warnings about link saturation if data-rate exceeds links speeds in the network route.

In an embodiment of the invention, if TCP is used, and the inter-message-time is greater than twice of the round-trip-time, a warning flag may be set. The object transmission time may be calculated as follows:

If streaming message size*8<=Amount sent during linear ramp-up, then

Object Transmission Time=square-root(2*streaming message size*8/Slope)

If streaming message size>Amount sent during linear ramp-up, then

Object Transmission Time=Time spent in steady-state phase after ramp-up+Time for the TCP/IP ramp-up process In an embodiment of the invention, if the object transmission time is greater than the inter-message-time, then a warning may sent to the user that either there need to be concurrent overlapping TCP connections so that messages can be sent concurrently OR a queue will build up in the sender end-system (server/PC) because messages are being generate faster than TCP can deliver them.

The Streaming Model 350 may further compute the steady-state throughput as follows:

$Tput_{ss}$ (Throughput)=TCP/IP receive window size*8/measure network round-trip time between transfer end-points The Streaming Model 350 may further compute how long it may take to transmit 64 Kb, that is, the 64 Kb transmission time. The 64 Kb transmission time may be computed as follows:

64 KB transmission time=square-root(2*64000*8/m), where m=(64000*8/rtt)/(6*rtt) and rtt=round-trip-time between transfer end-points The Streaming Model 350 may then generate one or more model specific outputs. Examples of Streaming Model specific output include, but are not limited to, warnings on whether the message stream will have performance problems due to TCP slow starts, the time required to transmit the message size specified, warnings on the fact that the transmission time will be affected by whether or not the messages are long enough to overcome the TCP slow-start phase if the idle time between messages is larger than a couple-few round-trip-times, the data rate that can be achieved after TCP has reached its steady-state phase ($Tput_{ss}$), and a warning if the time between messages is greater than the time to send one message—indicating that a sending queue will build during stream operation. The Streaming Model 350 may also report the data rate that the stream will place onto the network and warn that if this is higher than link speeds for the route that network congestion will occur. An example of a model-specific output for a Streaming Model 350 is described in greater detail in reference with FIG. 10B.

FIG. 4A is a user interface illustrating a Web Dashboard of an Application and Infrastructure Performance Analysis and Forecasting System in accordance with an embodiment of the invention. Specifically, FIG. 4A illustrates a Web Dashboard 400 for receiving initial information regarding system configuration and performance objectives. The Web Dashboard 400 may contain a section with questions about the design of the system, that is, a System Design Survey section 405. The System Design Survey section 405 may allow a user to choose one or more system design parameters that match the user's system design. For example, a user may be able to select whether the system design is a web-based system that requires real-time delivery of a continual stream of large data items. The user may be able to further select that the system uses a messaging queue or includes a database layer that is utilized by other processing tiers. Other examples of system design parameters include, but are not limited to, the transport protocol (e.g. UDP, TCP, etc.), synchronous/asynchronous transfer of data, use of web-constructs, etc. The Web Dashboard 400 may also contain a section with questions about the performance requirements, that is, a Performance Requirements section 410. The Performance Requirements section 410 may allow a user to specify one or more performance requirements that he/she would like to achieve. Examples of performance requirements include, but are not limited to, the strictness of performance management, measure of performance (e.g., throughput, response times to user commands, message delays and delay variations, etc.), goal and objectives of the system, etc.

FIG. 4B is a user interface illustrating a Web Dashboard of an Application and Infrastructure Performance Analysis and Forecasting System in accordance with an embodiment of the invention. Specifically, FIG. 4B illustrates additional sections of the Web Dashboard 400 for receiving initial information regarding system configuration and performance objectives. The Web Dashboard 400 may contain a section with questions about the system configuration, that is, a System Configuration section 415. The System Configuration section 415 may allow a user to select one or more system configuration parameters. For example, a user may be able to select the location of the various transfer end-points (e.g., users), system concerns (e.g., communication between servers, communication between transfer end-points, etc.), degree of coupling between servers, type of information transferred between transfer end-points (e.g., video, voice, market data, message queue streams, etc.), distance between users and servers or processing tiers, proximity between transfer points, etc. The Web Dashboard 400 may contain an additional section with questions about the system configuration, that is, a System Configuration II section 420. The System Configuration II section 420 may allow a user to specify the architecture of the system (e.g., the various tiers, such as data tier, web tier, mainframe tier, etc.), details about the applications (e.g., web-based), external data feeds, etc. After a user has selected the information about system design and configuration, as well as performance requirements, a user may select a Submit Survey button 430 to submit the initial infrastructure information to the Application and Infrastructure Performance Analysis and Forecasting System. After the initial infrastructure information is submitted to the Application and Infrastructure Performance Analysis and Forecasting System, the user may be presented with one or more application and infrastructure performance models for which additional input may be required.

FIG. 5A is a user interface illustrating a Web Dashboard of an Application and Infrastructure Performance Analysis and Forecasting System in accordance with an embodiment of the invention. Specifically, FIG. 5A illustrates a Web Dashboard 500 for receiving model specific input for the User Response Time Model. The Web Dashboard 500 may contain a section with model specific questions 510. Examples of User Response Time Model questions include, but are not limited to, the user-server configuration, location of users, location of servers, round-trip time between users and servers, the number of objects sent to the server as part of a transaction, whether the objects are sent sequentially or in parallel, the number of objects comprising a response, the size of the objects, whether the objects are part of GET/POST web commands, etc. The Web Dashboard 500 may also contain a section that visually displays the configuration of the application and infrastructure system, that is, a Visual Section 520. In an embodiment of the invention, a user may be able to specify values for one or more User Response Time Model specific inputs using the Visual Section 520. Upon entering all the information related to the User Response Time Model, a user may select the Submit for Analysis button 530 and submit the User Response Time Model specific information to the Application and Infrastructure Performance Analysis and Forecasting System.

FIG. 5B is a user interface illustrating a Web Dashboard of an Application and Infrastructure Performance Analysis and Forecasting System in accordance with an embodiment of the invention. Specifically, FIG. 5B illustrates a Web Dashboard 540 for displaying model specific output for the User Response Time Model. In an embodiment of the invention, the Web Dashboard 540 may display a User Response Time Report 550. The User Response Time Report 550 may display the following information: transaction run-time, time required to complete the transmission portion of a user transmission, and advice on traffic volumes the transaction will generate when driven by a population of users. The Web Dashboard 540 may also display User Response Time Model output information in the form of a visual (such as, a system design diagram).

FIG. 6A is a user interface illustrating a Web Dashboard of an Application and Infrastructure Performance Analysis and Forecasting System in accordance with an embodiment of the invention. Specifically, FIG. 6A illustrates a Web Dashboard 600 for receiving model specific input for the Bulk Transfer Model. The Web Dashboard 600 may contain a section with model specific questions 610. Examples of Bulk Transfer Model questions include, but are not limited to, location of transfer end points, network round-trip time, transfer size, whether there is a transfer-time requirement, the application or protocol user for the transfer (e.g., FTP, Secure Copy, Secure File Transfer Protocol), etc. The Web Dashboard 600 may also contain a section that visually displays the configuration of the application and infrastructure system, that is, a Visual Section 620. In an embodiment of the invention, a user may be able to specify values for one or more Bulk Transfer Model specific inputs using the Visual Section 620. Upon entering all the information related to the Bulk Transfer Model, a user may submit the Bulk Transfer Model specific information to the Application and Infrastructure Performance Analysis and Forecasting System.

FIG. 6B is a user interface illustrating a Web Dashboard of an Application and Infrastructure Performance Analysis and Forecasting System in accordance with an embodiment of the invention. Specifically, FIG. 6B illustrates a Web Dashboard 630 for displaying model specific output for the Bulk Transfer Model. In an embodiment of the invention, the Web Dashboard 630 may display a Bulk Transfer Report 640. The Bulk Transfer Report 640 may display the following information: the time to transfer an object using specified and/or default setting parameters, advice on whether the transfer of specified bulk data will saturate network links, whether FTP will handle the transfer size, and whether traffic throttles should be used. The Web Dashboard 630 may also display Bulk Transfer Model output information in the form of a visual (such as, a system design diagram).

FIG. 7A is a user interface illustrating a Web Dashboard of an Application and Infrastructure Performance Analysis and Forecasting System in accordance with an embodiment of the invention. Specifically, FIG. 7A illustrates a Web Dashboard 700 for receiving model specific input for the Message Queue and Database Response Time Model. The Web Dashboard 700 may contain a section with model specific questions 710. Examples of Message Queue and Database Response Time Model questions include, but are not limited to, location of transfer end points, network round-trip time, whether messaging is synchronous/sequential versus asynchronous/parallel/overlapping, message size estimates, etc. The Web Dashboard 700 may also contain a section that visually displays the configuration of the application and infrastructure system, that is, a Visual Section 720. In an embodiment of the invention, a user may be able to specify values for one or more Message Queue and Database Response Time Model specific inputs using the Visual Section 720. Upon entering all the information related to the Message Queue and Database Response Time Model, a user may submit the Message Queue and Database Response Time Model specific information to the Application and Infrastructure Performance Analysis and Forecasting System.

FIG. 7B is a user interface illustrating a Web Dashboard of an Application and Infrastructure Performance Analysis and Forecasting System in accordance with an embodiment of the invention. Specifically, FIG. 7B illustrates a Web Dashboard 730 for displaying model specific output for the Message Queue and Database Response Time Model. In an embodiment of the invention, the Web Dashboard 730 may display a Message Queue and Database Response Time Analysis Report 740. The Message Queue and Database Response Time Analysis Report 740 may display the following information: the time to transfer a message of specified size (message transmission time) based on presumed default setting parameters and user-specified message size, intra-messaging data rate of the network, the messaging rate that can be achieved if the messaging is synchronous/sequential, etc. The Web Dashboard 730 may also display Message Queue and Database Response Time Model output information in the form of a visual (such as, a system design diagram).

FIG. 8A is a user interface illustrating a Web Dashboard of an Application and Infrastructure Performance Analysis and Forecasting System in accordance with an embodiment of the invention. Specifically, FIG. 8A illustrates a Web Dashboard 800 for receiving model specific input for the Message Delay and Variation Analysis Model. The Web Dashboard 800 may contain a section with model specific questions 810. Examples of Message Delay and Variation Analysis Model questions include, but are not limited to, round-trip time between transfer end-points, message object size, inter-messaging timing, messaging rate, etc. The Web Dashboard 800 may also contain a section that visually displays the configuration of the application and infrastructure system, that is, a Visual Section 820. In an embodiment of the invention, a user may be able to specify values for one or more Message Delay and Variation Analysis Model specific inputs using the Visual Section 820. Upon entering all the information related to the Message Delay and Variation Analysis Model, a user may submit the Message Queue and Database Response Time Model specific information to the Application and Infrastructure Performance Analysis and Forecasting System by selecting the button Submit for Analysis 830.

FIG. 8B is a user interface illustrating a Web Dashboard of an Application and Infrastructure Performance Analysis and Forecasting System in accordance with an embodiment of the invention. Specifically, FIG. 8B illustrates a Web Dashboard 840 for displaying model specific output for the Message Delay and Variation Analysis Model. In an embodiment of the invention, the Web Dashboard 840 may display a Message Delay and Traffic Analysis Report 850. The Message Delay and Traffic Analysis Report 850 may display the following information: warnings on whether the message stream will have performance problems due to TCP slow starts, the time required to transmit the message size specified, warnings on the fact that the transmission time will be affected by whether or not the messages are long enough to overcome the TCP slow-start phase if the idle time between messages is larger than a couple-few round-trip-times, the data rate that can be achieved after TCP has reached its steady-state phase ($Tput_{ss}$), and a warning if the time between messages is greater than the time to send one message—indicating that a sending queue will build during stream operation. The Message Delay and Traffic Analysis Report 850 may also display the data rate that the stream will place onto the network and warn that if this is higher than link speeds for the route that network congestion will occur. The Web Dashboard 840 may also display Message Delay and Variation Analysis Model output information in the form of a visual (such as, a system design diagram).

FIG. 9A is a user interface illustrating a Web Dashboard of an Application and Infrastructure Performance Analysis and Forecasting System in accordance with an embodiment of the invention. Specifically, FIG. 9A illustrates a Web Dashboard 900 for receiving model specific input for the Market Data Distribution Model. The Web Dashboard 900 may contain a section with model specific questions 910. Examples of Market Data Distribution Model questions include, but are not limited to, hop configuration (e.g., number of hops in the route from source to consumers), route length (e.g., network round-trip time), transfer protocol (e.g., TCP, UDP, etc.), message size estimates, etc. The Web Dashboard 900 may also contain a section that visually displays the configuration of the application and infrastructure system, that is, a Visual Section 920. In an embodiment of the invention, a user may be able to specify values for one or more Market Data Distribution Model specific inputs using the Visual Section 920. Upon entering all the information related to the Market Data Distribution Model, a user may submit the Market Data Distribution Model specific information to the Application and Infrastructure Performance Analysis and Forecasting System by selecting the button Submit for Analysis 930.

FIG. 9B is a user interface illustrating a Web Dashboard of an Application and Infrastructure Performance Analysis and Forecasting System in accordance with an embodiment of the invention. Specifically, FIG. 9B illustrates a Web Dashboard 940 for displaying model specific output for the Market Data Distribution Model. In an embodiment of the invention, the Web Dashboard 940 may display a Market Data Distribution Latency Report 950. The Market Data Distribution Latency Report 950 may display the following information: the amount of time spent transmitting/serializing the messages through the entire route, the amount of time spent in switching delays through the entire route, the amount of time spent traveling over distance (the one-way measured latency minus the sum of the above values), etc. The Web Dashboard 940 may also display Market Data Distribution Model output information in the form of a visual (such as, a system design diagram).

FIG. 10A is a user interface illustrating a Web Dashboard of an Application and Infrastructure Performance Analysis and Forecasting System in accordance with an embodiment of the invention. Specifically, FIG. 10A illustrates a Web Dashboard 1000 for receiving model specific input for the Streaming Model. The Web Dashboard 1000 may contain a section with model specific questions 1010. Examples of Streaming Model questions include, but are not limited to, round-trip time between transfer end-points, message object size(s), inter-messaging timing, messaging rate, etc. The Web Dashboard 1000 may also contain a section that visually displays the configuration of the application and infrastructure system, that is, a Visual Section 1020. In an embodiment of the invention, a user may be able to specify values for one or more Streaming Model specific inputs using the Visual Section 1020. Upon entering all the information related to the Streaming Model, a user may submit the Streaming Model specific information to the Application and Infrastructure Performance Analysis and Forecasting System by selecting the button Submit for Analysis 1030.

FIG. 10B is a user interface illustrating a Web Dashboard of an Application and Infrastructure Performance Analysis and Forecasting System in accordance with an embodiment of the invention. Specifically, FIG. 10B illustrates a Web Dashboard 1040 for displaying model specific output for the Streaming Model. In an embodiment of the invention, the Web Dashboard 1040 may display a Streaming Traffic Analysis Report 1050. The Streaming Traffic Analysis Report 1050 may display the following information: The Streaming Traffic Analysis Report 1050 may display the following information: warnings on whether the message stream will have performance problems due to TCP slow starts, the time required to transmit the message size specified, warnings on the fact that the transmission time will be affected by whether or not the messages are long enough to overcome the TCP slow-start phase if the idle time between messages is larger than a couple-few round-trip-times, the data rate that can be achieved after TCP has reached its steady-state phase ($Tput_{ss}$), and a warning if the time between messages is greater than the time to send one message—indicating that a sending queue will build during stream operation. The Streaming Traffic Analysis Report 1050 may also display the data rate that the stream will place onto the network and warn that if this is higher than link speeds for the route that network congestion will occur. The Web Dashboard 1040 may also display Streaming Model output information in the form of a visual (such as, a system design diagram).

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A computer implemented application and infrastructure performance analysis and forecasting system, including at least a computer processor and a memory, the system improving performance of at least one application and infrastructure and reducing complexity of analyzing the performance of the application and infrastructure, the system comprising:

a web dashboard for receiving infrastructure input from a user regarding application and infrastructure configuration and at least one performance objective using a user interface at a display device;

a modeling engine for determining using the computer processor operatively connected with the web dashboard over a network, at least one application and infrastructure performance model based on the infrastructure input received from the user, wherein the at least one application and infrastructure performance model is a user response time model;

a model input user interface at the display device for receiving model specific input from the user for the at least one application and infrastructure performance model;

a model computation engine for computing using the computer processor operatively connected with the model input user interface over a network, output of the at least one application and infrastructure performance model based on the model specific input from the user and the at least one performance objective input by the user, wherein the output includes system parameters for modification to achieve the at least one performance objective;

and a web dashboard for displaying the output of the at least one application and infrastructure performance model using a user interface at the display device.

2. The application and infrastructure performance analysis and forecasting system of claim 1 further comprising: an output transmission engine for transmitting the output of the at least one application and infrastructure performance model to a remote interface over a network.

3. The application and infrastructure performance analysis and forecasting system of claim 1, wherein the output of the application and infrastructure performance model includes a user response time metric.

4. The application and infrastructure performance analysis and forecasting system of claim 1, wherein the infrastructure input is a system design of the application and infrastructure configuration.

5. The application and infrastructure performance analysis and forecasting system of claim 1, wherein the output of the application and infrastructure performance model includes a network traffic analysis metric.

6. The application and infrastructure performance analysis and forecasting system of claim 1, wherein the output of the application and infrastructure performance model includes numerical output.

7. The application and infrastructure performance analysis and forecasting system of claim 1, wherein the output of the application and infrastructure performance model includes visual output.

8. The application and infrastructure performance analysis and forecasting system of claim 1, wherein the infrastructure input is at least one of the following:

user-server configuration;

round-trip time between transfer end points;

number of objects sent to transfer end points;

number of objects comprising a response;

location of transfer end points;

size of information being transferred;

transfer time requirements;

application used for transfer of data between transfer end points;

size of at least one object transferred between transfer end points;

information transfer protocol;

mode of dataflow operation between transfer end points;

information transfer rate;

number of hops between transfer end points;

measured round trip time between transfer end points;

type of switches comprising a network route;

type of routers comprising a network route;

speed of links comprising a network route;

type of links comprising a network route;

receive window size utilized by transfer end points; and type of information transfer.

9. The application and infrastructure performance analysis and forecasting system of claim 1, wherein the application and infrastructure performance model is a bulk transfer model.

10. The application and infrastructure performance analysis and forecasting system of claim 1, wherein the application and infrastructure performance model is a message queue and database response time model.

11. The application and infrastructure performance analysis and forecasting system of claim 1, wherein the application and infrastructure performance model is a message delay and variation model.

12. The application and infrastructure performance analysis and forecasting system of claim 1, wherein the application and infrastructure performance model is a market data distribution model.

13. The application and infrastructure performance analysis and forecasting system of claim 1, wherein the application and infrastructure performance model is a streaming model.

14. A computer implemented application and infrastructure performance analysis and forecasting method for improving performance of at least one application and infrastructure and reducing complexity of analyzing the performance of the application and infrastructure, using an application and infrastructure performance analysis and forecasting system, including at least a computer processor and a memory, the memory storing at least one data module, the method comprising:

receiving, using a web dashboard, infrastructure input from a user regarding application and infrastructure configuration and at least one performance objective using a user interface at a display device;

determining, using a modeling engine executing at the computer processor operatively connected with the web dashboard over a network, at least one application and infrastructure performance model based on the infrastructure input received from the user, wherein the at least one application and infrastructure performance model is a user response time model;

receiving, using a model input user interface at the display device, model specific input from the user for the at least one application and infrastructure performance model;

computing, using a model computation engine executing at the computer processor operatively connected with the model input user interface over a network, output of the at least one application and infrastructure performance model based on the model specific input from the user and the at least one performance objective input by the user, wherein the output includes system parameters for modification to achieve the at least one performance objective;

and displaying, using a web dashboard, the output of the at least one application and infrastructure performance model using a user interface at the display device.

15. The application and infrastructure performance analysis and forecasting method of claim 14, further comprising: transmitting, using an output transmission engine, the output of the at least one application and infrastructure performance model to a remote interface over a network.

16. The application and infrastructure performance analysis and forecasting method of claim 14, wherein the output of the application and infrastructure performance model includes a user response time metric.

17. The application and infrastructure performance analysis and forecasting method of claim 14, wherein the infrastructure input is a system design of the application and infrastructure configuration.

18. The application and infrastructure performance analysis and forecasting method of claim 14, wherein the output of the application and infrastructure performance model includes a network traffic analysis metric.

19. The application and infrastructure performance analysis and forecasting method of claim 14, wherein the output of the application and infrastructure performance model includes numerical output.

20. The application and infrastructure performance analysis and forecasting method of claim 14, wherein the output of the application and infrastructure performance model includes visual output.

21. The application and infrastructure performance analysis and forecasting method of claim 14, wherein the infrastructure input is at least one of the following:

user-server configuration;

round-trip time between transfer end points;

number of objects sent to transfer end points;

number of objects comprising a response;

location of transfer end points;

size of information being transferred;
transfer time requirements;
application used for transfer of data between transfer end points;
size of at least one object transferred between transfer end points;
information transfer protocol;
mode of dataflow operation between transfer end points;
information transfer rate;
number of hops between transfer end points;
measured round trip time between transfer end points;
type of switches comprising a network route;
type of routers comprising a network route;
speed of links comprising a network route;
type of links comprising a network route;
receive window size utilized by transfer end points; and
type of information transfer.

22. The application and infrastructure performance analysis and forecasting method of claim 14, wherein the application and infrastructure performance model is a bulk transfer model.

23. The application and infrastructure performance analysis and forecasting method of claim 14, wherein the application and infrastructure performance model is a message queue and database response time model.

24. The application and infrastructure performance analysis and forecasting method of claim 14, wherein the application and infrastructure performance model is a message delay and variation model.

25. The application and infrastructure performance analysis and forecasting method of claim 14, wherein the application and infrastructure performance model is a market data distribution model.

26. The application and infrastructure performance analysis and forecasting method of claim 14, wherein the application and infrastructure performance model is a streaming model.

27. The application and infrastructure performance analysis and forecasting system of claim 1, wherein the model computation engine determines a system design or configuration parameter for modification to achieve the at least one performance objection.

28. The application and infrastructure performance analysis and forecasting method of claim 14, further comprising determining, by the model computation engine, a system design or configuration parameter for modification to achieve the at least one performance objection.

* * * * *